(12) United States Patent
Liu et al.

(10) Patent No.: US 9,126,156 B2
(45) Date of Patent: *Sep. 8, 2015

(54) SELF CROSS-LINKABLE AND SELF CROSS-LINKED AROMATIC POLYIMIDE MEMBRANES FOR SEPARATIONS

(71) Applicant: UOP LLC, Des Plaines, IL (US)

(72) Inventors: Chunqing Liu, Arlington Heights, IL (US); Zara Osman, Glenview, IL (US); Angela N. Troxell, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/039,502

(22) Filed: Sep. 27, 2013

(65) Prior Publication Data

US 2015/0090118 A1    Apr. 2, 2015

(51) Int. Cl.
*C08G 69/08* (2006.01)
*B01D 71/64* (2006.01)
*B01D 53/22* (2006.01)
*B01D 61/36* (2006.01)

(52) U.S. Cl.
CPC .............. *B01D 71/64* (2013.01); *B01D 53/228* (2013.01); *B01D 61/362* (2013.01)

(58) Field of Classification Search
CPC ........... C08G 73/1042; C08G 73/1053; C08G 73/1064; C08G 73/1067; C08G 73/1007; C08G 73/1025; C08G 73/10
USPC ....................................... 525/432, 436; 502/4
See application file for complete search history.

(56) References Cited

U.S. PATENT DOCUMENTS

| | | | |
|---|---|---|---|
| 4,931,182 A | 6/1990 | Burgoyne, Jr. et al. | |
| 7,485,173 B1 | 2/2009 | Liu et al. | |
| 2005/0268783 A1 | 12/2005 | Koros et al. | |
| 2009/0178561 A1 | 7/2009 | Miller et al. | |
| 2009/0182097 A1 | 7/2009 | Miller et al. | |
| 2010/0242723 A1* | 9/2010 | Liu et al. .......................... 95/46 |
| 2010/0243567 A1* | 9/2010 | Liu et al. ....................... 210/640 |

OTHER PUBLICATIONS

Chen, "Plasticization-resistant hollow fiber membranes for CO2/CH4 separation based on a thermally crosslinkable polyimide", Journal of Membrane Science 382 (2011) 212-221.
Liu, "Chemical cross-linking modification of polyimide membranes for gas separation", Journal of Membrane Science 189 (2001) 231-239.
U.S. Appl. No. 14/039,477, filed Sep. 27, 2013.

* cited by examiner

*Primary Examiner* — Shane Fang

(57) ABSTRACT

This invention relates to self-cross-linkable and self-cross-linked aromatic polyimide polymers, their membranes and methods for making and using these polymers and membranes. The self-cross-linkable aromatic polyimide polymer described in the present invention comprises both hydroxyl functional groups and carboxylic acid functional groups. The self-cross-linked aromatic polyimide was formed via heating the self-cross-linkable aromatic polyimide polymer at ≤300° C. The self-cross-linked aromatic polyimide membranes exhibit high selectivity in separation of mixtures of gases and liquids.

16 Claims, No Drawings

SELF CROSS-LINKABLE AND SELF CROSS-LINKED AROMATIC POLYIMIDE MEMBRANES FOR SEPARATIONS

BACKGROUND OF THE INVENTION

This invention relates to self-cross-linkable and self-cross-linked aromatic polyimide membranes that are highly resistant to hydrocarbons and methods for making and using these membranes.

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications of membrane gas separation have achieved commercial success, including $N_2$ enrichment from air, carbon dioxide removal from natural gas and from enhanced oil recovery, and also in hydrogen removal from nitrogen, methane, and argon in ammonia purge gas streams. For example, UOP's Separex™ cellulose acetate spiral wound polymeric membrane is currently an international market leader for carbon dioxide removal from natural gas.

Polymers provide a range of properties including low cost, permeability, mechanical stability, and ease of processability that are important for gas separation. Glassy polymers (i.e., polymers at temperatures below their $T_g$) have stiffer polymer backbones and therefore let smaller molecules such as hydrogen and helium pass through more quickly, while larger molecules such as hydrocarbons pass through more slowly as compared to polymers with less stiff backbones. Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability.

The membranes most commonly used in commercial gas and liquid separation applications are asymmetric polymeric membranes that have a thin nonporous selective skin layer that performs the separation. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as permeability or $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

One of the components to be separated by a membrane must have a sufficiently high permeance at the preferred conditions or extraordinarily large membrane surface areas is required to allow separation of large amounts of material. Permeance, measured in Gas Permeation Units (GPU, 1 GPU=$10^{-6}$ cm$^3$ (STP)/cm$^2$ s (cm Hg)), is the pressure normalized flux and equals to permeability divided by the skin layer thickness of the membrane. Commercially available gas separation polymer membranes, such as CA, polyimide, and polysulfone membranes formed by phase inversion and solvent exchange methods have an asymmetric integrally skinned membrane structure. Such membranes are characterized by a thin, dense, selectively semipermeable surface "skin" and a less dense void-containing (or porous), non-selective support region, with pore sizes ranging from large in the support region to very small proximate to the "skin". However, fabrication of defect-free high selectivity asymmetric integrally skinned polyimide membranes is difficult. The presence of nanopores or defects in the skin layer reduces the membrane selectivity. The high shrinkage of the polyimide membrane on cloth substrate during membrane casting and drying process results in unsuccessful fabrication of asymmetric integrally skinned polyimide membranes using phase inversion technique.

In order to combine high selectivity and high permeability together with high thermal stability, new high-performance polymers such as polyimides (PIs), poly(trimethylsilylpropyne) (PTMSP), and polytriazole were developed. These new polymeric membrane materials have shown promising properties for separation of gas pairs like $CO_2/CH_4$, $O_2/N_2$, $H_2/CH_4$, and $C_3H_6/C_3H_8$. However, current polymeric membrane materials have reached a limit in their productivity-selectivity trade-off relationship. In addition, gas separation processes based on glassy polymer membranes frequently suffer from plasticization of the stiff polymer matrix by sorbed penetrating molecules such as $CO_2$ or $C_3H_6$. Plasticization of the polymer is exhibited by swelling of the membrane structure and by a significant increase in the permeances of all components in the feed and decrease of selectivity occurring above the plasticization pressure when the feed gas mixture contains condensable gases. Plasticization is particularly an issue for gas fields containing high $CO_2$ concentrations and heavy hydrocarbons and for systems requiring two-stage membrane separation.

US 2005/0268783 A1, US 2009/0182097 A1, and US 2009/0178561 A1 disclosed chemically cross-linked polyimide hollow fiber membranes prepared from two separate steps. Step one is the synthesis of a monoesterified polyimide polymer in a solution by treating a polyimide polymer containing carboxylic acid functional group with a small diol molecule at esterification conditions in the presence of dehydrating conditions. However, a significant extra amount of diol was used to prevent the formation of biesterified polyimide polymer. Step two is the solid state transesterification of the monoesterified polyimide membrane at elevated temperature to form a cross-linked polyimide membrane.

Chemical cross-linking of polyimides using diamine small molecules has also been disclosed. (J. MEMBR. SCI., 2001, 189, 231-239). However, $CO_2$ permeability decreased significantly after this type of cross-linking. In addition, the thermal stability and hydrolytic stability of the diamine cross-linked polyimide were not improved.

Koros et al. disclosed decarboxylation-induced thermally cross-linked polyimide membrane. (J. MEMBR. SCI., 2011, 382, 212-221) However, decarboxylation reaction among the carboxylic acid groups on the carboxylic acid group-containing polyimide membrane occurred at temperatures higher than the glass transition temperature of the polyimide polymer. Such a high temperature resulted in densification of the substructure of the membrane and decreased membrane permeance.

U.S. Pat. No. 7,485,173 disclosed UV cross-linked mixed matrix membranes via UV radiation. The cross-linked mixed matrix membranes comprise microporous materials dispersed in the continuous UV cross-linked polymer matrix.

U.S. Pat. No. 4,931,182 and U.S. Pat. No. 7,485,173 disclosed physically cross-linked polyimide membranes via UV radiation. The cross-linked membranes showed improved selectivities for gas separations. However, it is hard to control the cross-linking degree of the thin selective layer of the asymmetric gas separation membranes using UV radiation technique, which will result in very low permeances although the selectivities are normally very high.

The present invention discloses a new type of self-cross-linkable and self-cross-linked aromatic polyimide membranes and methods for making and using these membranes.

SUMMARY OF THE INVENTION

The present invention discloses a new type of self-cross-linkable and self-cross-linked aromatic polyimide membranes and methods for making and using these membranes.

An embodiment of the present invention is for a self-cross-linkable aromatic polyimide polymer and self-cross-linkable and self-cross-linked membranes made from this polymer. The self-cross-linkable aromatic polyimide polymer comprises both hydroxyl functional groups and carboxylic acid functional groups. The self-cross-linkable aromatic polyimide polymer may comprise a formula (I)

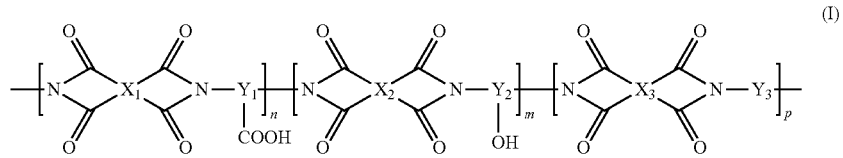

wherein $X_1$, $X_2$, and $X_3$ are selected from the group consisting of

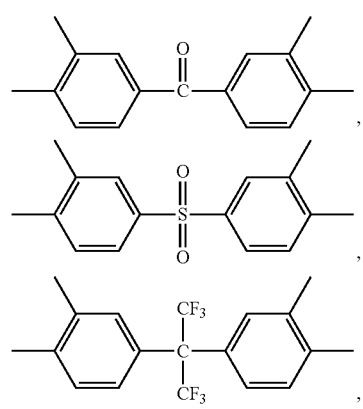

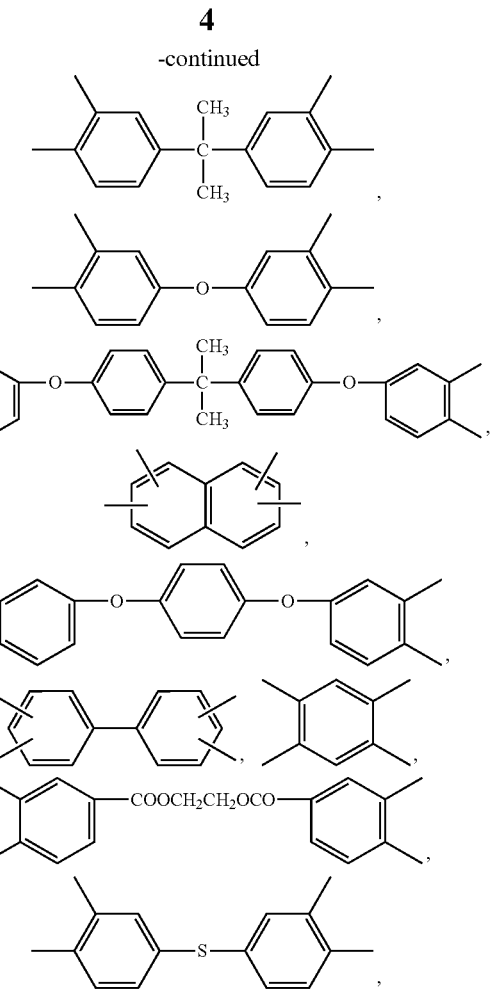

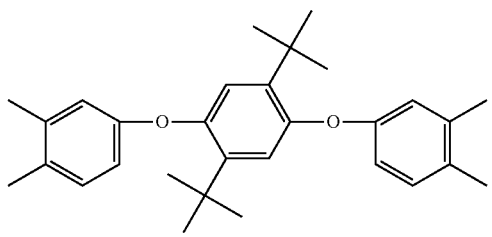

and mixtures thereof, respectively; $X_1$, $X_2$, and $X_3$ are the same or different from each other; $Y_1$—COOH is selected from the group consisting of

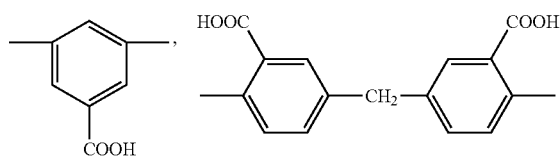

and mixtures thereof; Y$_2$—OH is selected from the group consisting of

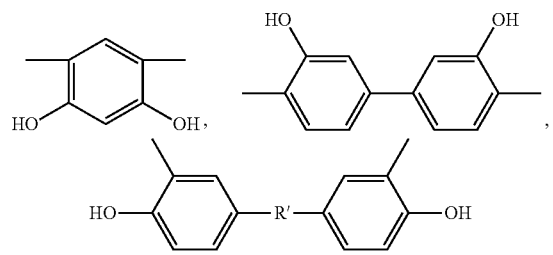

and mixtures thereof, and —R'— is selected from the group consisting of

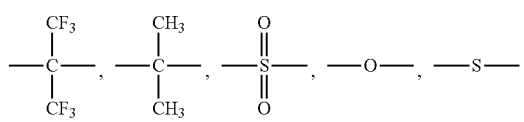

and mixtures thereof; Y$_3$ is selected from the group consisting of

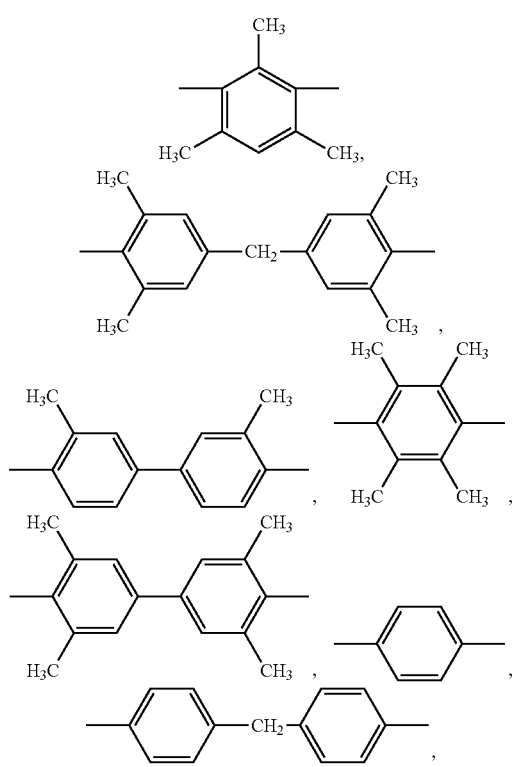

-continued

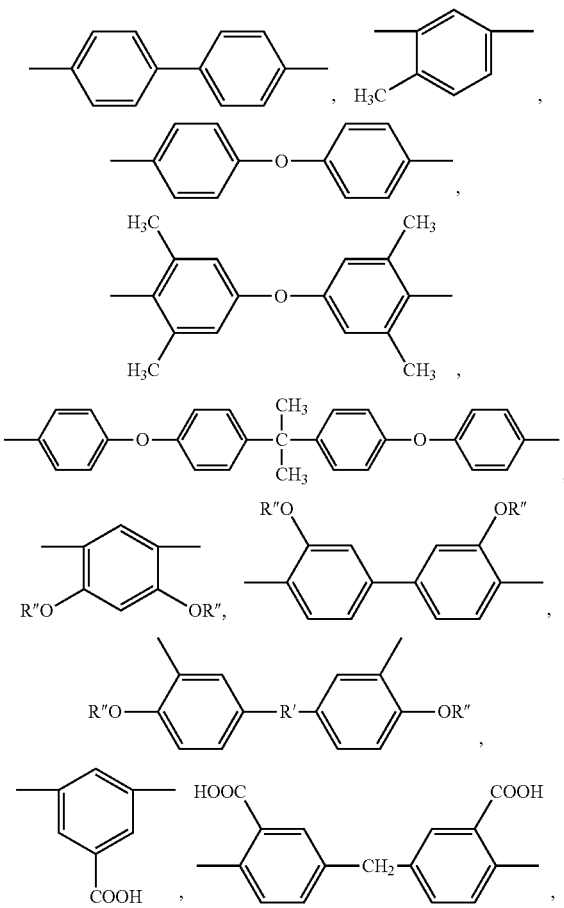

and mixtures thereof, and —R'— is selected from the group consisting of

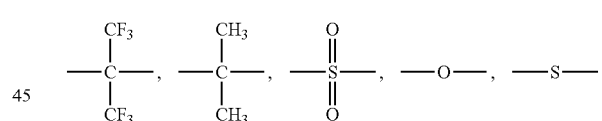

and mixtures thereof, and —R"— is selected from the group consisting of —H, COCH$_3$, and mixtures thereof; n, m, and p are independent integers from 2 to 500; the molar ratio of (n+m)/p is in a range of 1:20 to 1:0; the molar ratio of n/m is in a range of 1:10 to 10:1. Within formula (I), preferably X$_1$, X$_2$, and X$_3$ are selected from the group consisting of

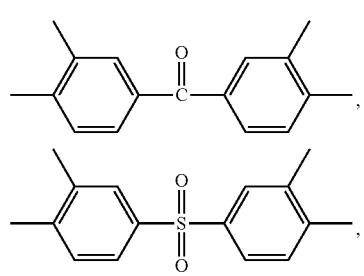

-continued

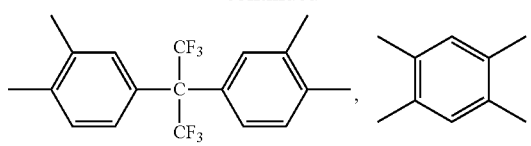

and mixtures thereof, respectively; $X_1$, $X_2$, and $X_3$ are the same or different from each other;

preferably $Y_1$—COOH is

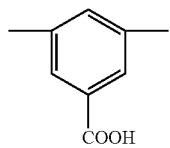

preferably $Y_2$—OH is

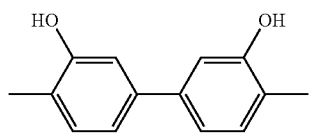

preferably $Y_3$ is selected from the group consisting of

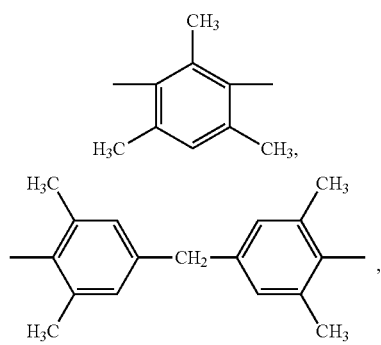

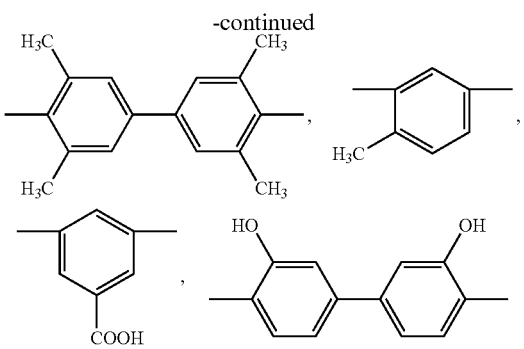

and mixtures thereof

The self-cross-linkable aromatic polyimide polymer comprises both hydroxyl functional groups and carboxylic acid functional groups can be self-cross-linked at a certain temperature to form a self-cross-linked polyimide polymer via covalent ester bonds. The self-cross-linked aromatic polyimide polymer may comprise a formula (II)

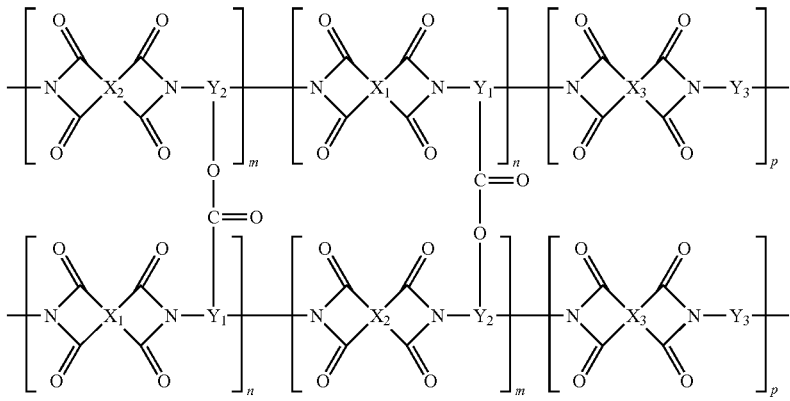

(II)

wherein $X_1$, $X_2$, and $X_3$ are selected from the group consisting of

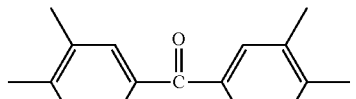

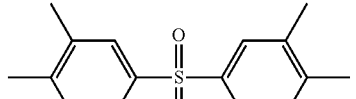

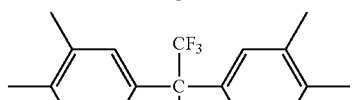

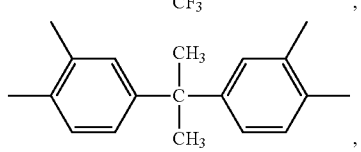

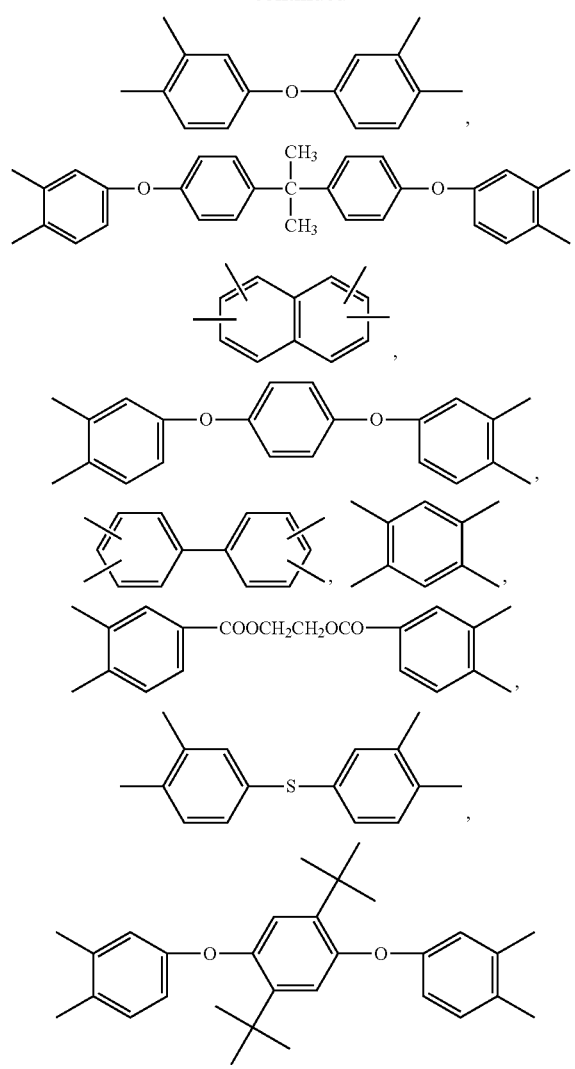
and mixtures thereof, respectively; $X_1$, $X_2$, and $X_3$ are the same or different from each other; $Y_1$—CO— is selected from the group consisting of
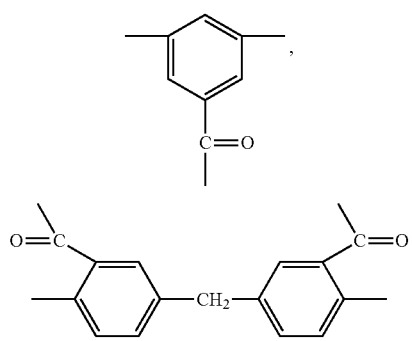
and mixtures thereof; $Y_2$—O— is selected from the group consisting of
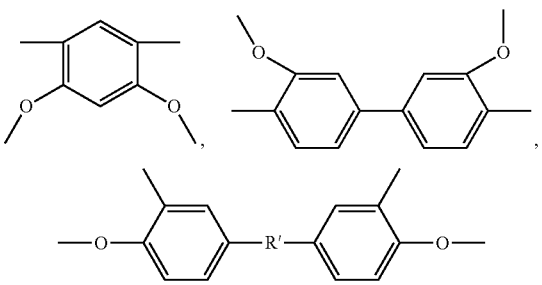
and mixtures thereof, and —R'— is selected from the group consisting of
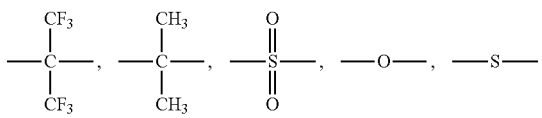
and mixtures thereof; $Y_3$ is selected from the group consisting of
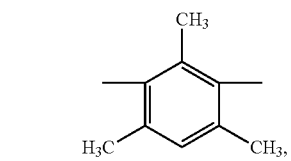
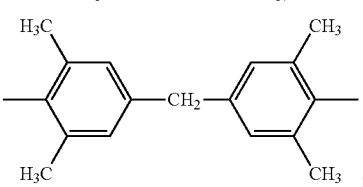
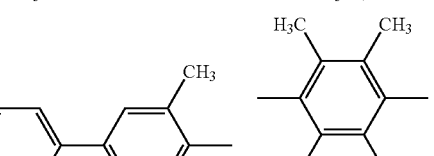
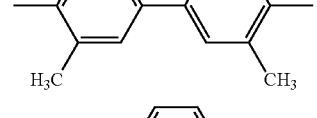
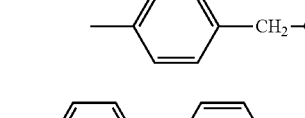
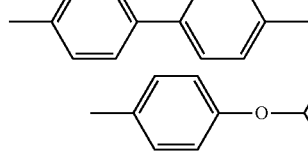

-continued

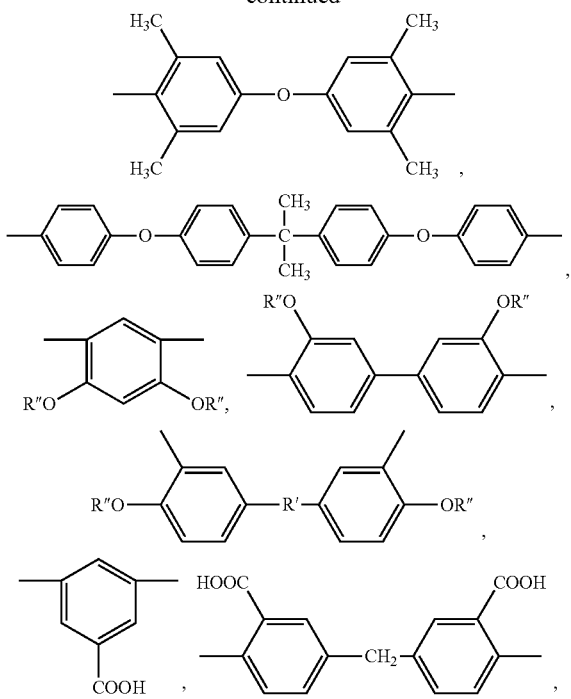

and mixtures thereof, and —R'— is selected from the group consisting of

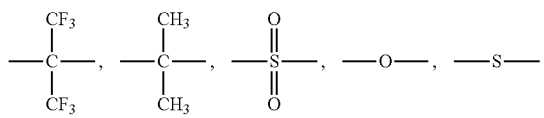

and mixtures thereof, and —R"— is selected from the group consisting of —H, COCH$_3$, and mixtures thereof; n, m, and p are independent integers from 2 to 500; the molar ratio of (n+m)/p is in a range of 1:20 to 1:0; and the molar ratio of n/m is in a range of 1:10 to 10:1. Within formula (II), preferably X$_1$, X$_2$, and X$_3$ are selected from the group consisting of

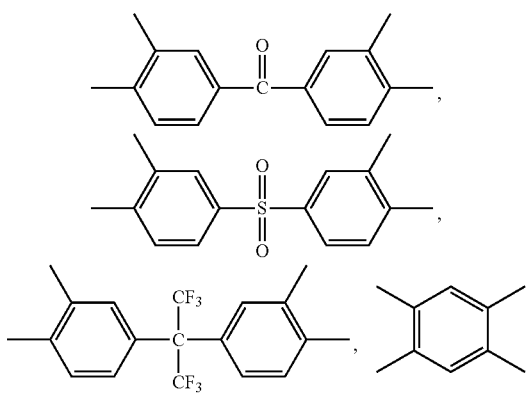

and mixtures thereof, respectively; X$_1$, X$_2$, and X$_3$ are the same or different from each other;

preferably Y$_1$—CO— is

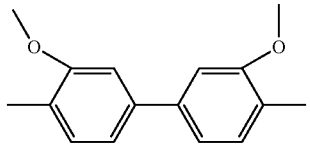

preferably Y$_2$—O— is

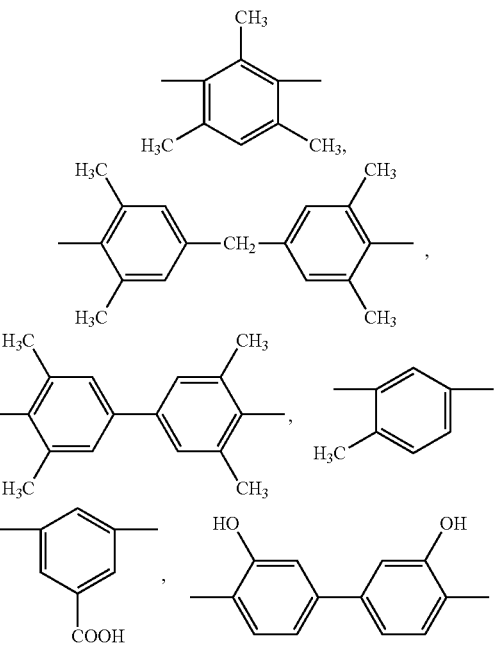

preferably Y$_3$ is selected from the group consisting of and mixtures thereof

The invention further comprises a process for preparing a self-cross-linked aromatic polyimide polymer membrane comprising making the self-cross-linkable aromatic polyimide polymer membrane from the self-cross-linkable aromatic polyimide polymer comprising both hydroxyl functional groups and carboxylic acid functional groups, and then cross-linking the self-cross-linkable aromatic polyimide polymer membrane by heating the membrane at about 250° C. to 350° C. under an inert atmosphere. The process of preparing the self-cross-linked aromatic polyimide polymer membrane may further involve coating a high permeability material onto the membrane such as a polysiloxane, a fluoro-polymer, a thermally curable silicone rubber, or a UV radiation curable epoxy silicone.

The self-cross-linkable aromatic polyimide polymer comprising both hydroxyl functional groups and carboxylic acid functional groups of the invention may be fabricated into any known membrane configuration or form.

The self-cross-linkable aromatic polyimide polymer comprising both hydroxyl functional groups and carboxylic acid functional groups of the invention may be selected from the group consisting of poly(3,3',4,4'-diphenylsulfone tetracarboxylic dianhydride-3,5-diaminobenzoic acid-3,3'-dihydroxy-4,4'-diamino-biphenyl-2,4,6-trimethyl-m-phenylenediamine)polyimide derived from a polycondensation reaction of 3,3',4,4'-diphenylsulfone tetracarboxylic dianhydride with a mixture of 3,5-diaminobenzoic acid, 3,3'-dihydroxy-4,4'-diamino-biphenyl and 2,4,6-trimethyl-m-phenylenediamine; poly(3,3',4,4'-diphenylsulfone tetracarboxylic dianhydride-3,5-diaminobenzoic acid-3,3'-dihydroxy-4,4'-diamino-biphenyl-3,3',5,5'-tetramethyl-4,4'-methylene dianiline)polyimide derived from a polycondensation reaction of 3,3',4,4'-diphenylsulfone tetracarboxylic dianhydride with a mixture of 3,5-diaminobenzoic acid, 3,3'-dihydroxy-4,4'-diamino-biphenyl and 3,3',5,5'-tetramethyl-4,4'-methylene dianiline; poly(3,3',4,4'-benzophenone tetracarboxylic dianhydride-pyromellitic dianhydride-3,5-diaminobenzoic acid-3,3'-dihydroxy-4,4'-diamino-biphenyl-2,4,6-trimethyl-m-phenylenediamine)polyimide derived from a polycondensation reaction of 3,3',4,4'-benzophenone tetracarboxylic dianhydride and pyromellitic dianhydride with 3,5-diaminobenzoic acid, 3,3'-dihydroxy-4,4'-diamino-biphenyl and 2,4,6-trimethyl-m-phenylenediamine; poly(3,3',4,4'-benzophenone tetracarboxylic dianhydride-pyromellitic dianhydride-3,5-diaminobenzoic acid-3,3'-dihydroxy-4,4'-diamino-biphenyl-3,3',5,5'-tetramethyl-4,4'-methylene dianiline)polyimide derived from a polycondensation reaction of 3,3',4,4'-benzophenone tetracarboxylic dianhydride and pyromellitic dianhydride with 3,5-diaminobenzoic acid, 3,3'-dihydroxy-4,4'-diamino-biphenyl and 3,3',5,5'-tetramethyl-4,4'-methylene dianiline; poly(3,3',4,4'-benzophenone tetracarboxylic dianhydride-3,5-diaminobenzoic acid-3,3'-dihydroxy-4,4'-diamino-biphenyl-3,3',5,5'-tetramethyl-4,4'-methylene dianiline)polyimide derived from a polycondensation reaction of 3,3',4,4'-benzophenone tetracarboxylic dianhydride with 3,5-diaminobenzoic acid, 3,3'-dihydroxy-4,4'-diamino-biphenyl and 3,3',5,5'-tetramethyl-4,4'-methylene dianiline; poly[2,2'-bis-(3,4-dicarboxyphenyl) hexafluoropropane dianhydride-3,5-diaminobenzoic acid-3,3'-dihydroxy-4,4'-diamino-biphenyl]polyimide derived from the polycondensation reaction of 2,2'-bis-(3,4-dicarboxyphenyl) hexafluoropropane dianhydride with a mixture of 3,5-diaminobenzoic acid and 3,3'-dihydroxy-4,4'-diamino-biphenyl; poly[2,2'-bis-(3,4-dicarboxyphenyl) hexafluoropropane dianhydride-2,2-bis(3-amino-4-hydroxyphenyl)-hexafluoropropane-3,5-diaminobenzoic acid] derived from a polycondensation reaction of 2,2'-bis-(3,4-dicarboxyphenyl) hexafluoropropane dianhydride with a mixture of 2,2-bis(3-amino-4-hydroxyphenyl)-hexafluoropropane and 3,5-diaminobenzoic acid; poly[3,3',4,4'-benzophenonetetracarboxylic dianhydride-2,2-bis(3-amino-4-hydroxyphenyl)-hexafluoropropane-3,5-diaminobenzoic acid] derived from a polycondensation reaction of 3,3',4,4'-benzophenonetetracarboxylic dianhydride with a mixture of 2,2-bis(3-amino-4-hydroxyphenyl)-hexafluoropropane and 3,5-diaminobenzoic acid; poly[4,4'-oxydiphthalic anhydride-2,2-bis(3-amino-4-hydroxyphenyl)-hexafluoropropane-3,5-diaminobenzoic acid] derived from a polycondensation reaction of 4,4'-oxydiphthalic anhydride with a mixture of 2,2-bis(3-amino-4-hydroxyphenyl)-hexafluoropropane and 3,5-diaminobenzoic acid; poly[3,3',4,4'-diphenylsulfone tetracarboxylic dianhydride-2,2-bis(3-amino-4-hydroxyphenyl)-hexafluoropropane-3,5-diaminobenzoic acid] derived from a polycondensation reaction of 3,3',4,4'-diphenylsulfone tetracarboxylic dianhydride with a mixture of 2,2-bis(3-amino-4-hydroxyphenyl)-hexafluoropropane and 3,5-diaminobenzoic acid; poly[2,2'-bis-(3,4-dicarboxyphenyl) hexafluoropropane dianhydride-3,3',4,4'-benzophenonetetracarboxylic dianhydride-2,2-bis(3-amino-4-hydroxyphenyl)-hexafluoropropane-3,5-diaminobenzoic acid] derived from a polycondensation reaction of 2,2'-bis-(3,4-dicarboxyphenyl) hexafluoropropane dianhydride and 3,3',4,4'-benzophenonetetracarboxylic dianhydride with a mixture of 2,2-bis(3-amino-4-hydroxyphenyl)-hexafluoropropane and 3,5-diaminobenzoic acid; poly[4,4'-oxydiphthalic anhydride-2,2-bis(3-amino-4-hydroxyphenyl)-hexafluoropropane-3,3'-dihydroxy-4,4'-diamino-biphenyl-3,5-diaminobenzoic acid] derived from a polycondensation reaction of 4,4'-oxydiphthalic anhydride with a mixture of 2,2-bis(3-amino-4-hydroxyphenyl)-hexafluoropropane, 3,3'-dihydroxy-4,4'-diamino-biphenyl and 3,5-diaminobenzoic acid; poly[3,3',4,4'-benzophenonetetracarboxylic dianhydride-2,2-bis(3-amino-4-hydroxyphenyl)-hexafluoropropane-3,3'-dihydroxy-4,4'-diamino-biphenyl-3,5-diaminobenzoic acid] derived from a polycondensation reaction of 3,3',4,4'-benzophenonetetracarboxylic dianhydride with a mixture of 2,2-bis(3-amino-4-hydroxyphenyl)-hexafluoropropane, 3,3'-dihydroxy-4,4'-diamino-biphenyl, and 3,5-diaminobenzoic acid.

Some preferred examples of the self-cross-linkable aromatic polyimide polymer comprising both hydroxyl functional groups and carboxylic acid functional groups described in the current invention may include, but are not limited to: poly(3,3',4,4'-diphenylsulfone tetracarboxylic dianhydride-3,5-diaminobenzoic acid-3,3'-dihydroxy-4,4'-diamino-biphenyl-2,4,6-trimethyl-m-phenylenediamine)polyimide derived from a polycondensation reaction of 3,3',4,4'-diphenylsulfone tetracarboxylic dianhydride with a mixture of 3,5-diaminobenzoic acid, 3,3'-dihydroxy-4,4'-diamino-biphenyl and 2,4,6-trimethyl-m-phenylenediamine; poly(3,3',4,4'-diphenylsulfone tetracarboxylic dianhydride-3,5-diaminobenzoic acid-3,3'-dihydroxy-4,4'-diamino-biphenyl-3,3',5,5'-tetramethyl-4,4'-methylene dianiline)polyimide derived from a polycondensation reaction of 3,3',4,4'-diphenylsulfone tetracarboxylic dianhydride with a mixture of 3,5-diaminobenzoic acid, 3,3'-dihydroxy-4,4'-diamino-biphenyl and 3,3',5,5'-tetramethyl-4,4'-methylene dianiline; poly(3,3',4,4'-benzophenone tetracarboxylic dianhydride-pyromellitic dianhydride-3,5-diaminobenzoic acid-3,3'-dihydroxy-4,4'-diamino-biphenyl-2,4,6-trimethyl-m-phenylenediamine) polyimide derived from a polycondensation reaction of 3,3',4,4'-benzophenone tetracarboxylic dianhydride and pyromellitic dianhydride with 3,5-diaminobenzoic acid, 3,3'-dihydroxy-4,4'-diamino-biphenyl and 2,4,6-trimethyl-m-phenylenediamine; poly(3,3',4,4'-benzophenone tetracarboxylic dianhydride-pyromellitic dianhydride-3,5-diaminobenzoic acid-3,3'-dihydroxy-4,4'-diamino-biphenyl-3,3',5,5'-tetramethyl-4,4'-methylene dianiline)polyimide derived from a polycondensation reaction of 3,3',4,4'-benzophenone tetracarboxylic dianhydride and pyromellitic dianhydride with 3,5-diaminobenzoic acid, 3,3'-dihydroxy-4,4'-diamino-biphenyl and 3,3',5,5'-tetramethyl-4,4'-methylene dianiline; poly[2,2'-bis-(3,4-dicarboxyphenyl) hexafluoropropane dianhydride-3,5-diaminobenzoic acid-3,3'-dihydroxy-4,4'-diamino-biphenyl]polyimide derived from the polycondensation reaction of 2,2'-bis-(3,4-dicarboxyphenyl) hexafluoropropane dianhydride with a mixture of 3,5-diaminobenzoic acid and 3,3'-dihydroxy-4,4'-diamino-biphenyl; poly(3,3',4,4'-diphenylsulfone tetracarboxylic dianhydride-3,5-diaminobenzoic acid-3,3'-dihydroxy-4,4'-diamino-biphenyl)polyimide derived from a polycondensation reaction of 3,3',4,4'-diphenylsulfone tetracarboxylic dianhydride with a mixture of 3,5-diaminobenzoic acid and 3,3'-dihydroxy-4,4'-diamino-biphenyl; poly(3,3',4,4'-benzophenone tetracarboxylic dianhydride-pyromellitic dianhydride-3,5-diaminobenzoic acid-3,3'-dihydroxy-4,4'-diamino-biphenyl)polyimide derived from a polycondensation reaction of 3,3',4,4'-benzophenone tetracarboxylic dianhydride and pyromellitic dianhydride with 3,5-diaminobenzoic acid and 3,3'-dihydroxy-4,4'-diamino-biphenyl.

The invention also involves a process for separating at least one gas from a mixture of gases comprising providing the self-cross-linked aromatic polyimide membrane of formula (II); contacting the mixture of gases to one side of the self-cross-linked aromatic polyimide membrane of formula (II) to cause at least one gas to permeate said membrane; and removing from an opposite side of said self-cross-linked aromatic polyimide membrane of formula (II) a permeate gas composition comprising a portion of said at least one gas that permeated said membrane.

DETAILED DESCRIPTION OF THE INVENTION

The present invention generally relates to a new type of self-cross-linkable aromatic polyimide polymer and high hydrocarbon resistant self-cross-linked aromatic polyimide polymer membrane made from the self-cross-linkable aromatic polyimide polymer. The present invention also relates to a method of making the high hydrocarbon resistant self-cross-linked aromatic polyimide membrane, as well as the use of high hydrocarbon resistant self-cross-linked aromatic polyimide membrane for gas, vapor, and liquid separations.

The term "self-cross-linkable aromatic polyimide polymer" in the present invention refers to an aromatic polyimide polymer comprising both carboxylic acid functional groups and hydroxyl functional groups wherein the carboxylic acid functional groups can react with the hydroxyl functional groups via heating. The term "self-cross-linked aromatic polyimide polymer membrane" in the present invention refers to an aromatic polyimide polymer membrane comprising self-cross-linked aromatic polyimide polymer that comprises covalent ester bonds formed from esterification reaction between carboxylic acid functional groups and hydroxyl functional groups.

The self-cross-linkable aromatic polyimide polymer and the self-cross-linkable aromatic polyimide polymer membrane described in the present invention comprise both hydroxyl functional groups and carboxylic acid functional groups. The self-cross-linkable aromatic polyimide polymer and the self-cross-linkable aromatic polyimide polymer membrane described in the present invention comprise a plurality of repeating units of formula (I), wherein formula (I) comprises carboxylic acid functional groups and hydroxyl functional groups, and wherein the carboxylic acid functional groups can react with the hydroxyl functional groups via covalent ester bonds at 250° C.-350° C. to form self-cross-linked aromatic polyimide polymer described in the present invention comprising a plurality of repeating units of formula (II). The self-cross-linked aromatic polyimide polymer and the high hydrocarbon resistant self-cross-linked aromatic polyimide polymer membrane described in the present invention comprise aromatic polyimide polymer chain segments where at least part of these polymer chain segments are cross-linked to each other through direct covalent ester bonds. The formation of the covalent ester bonds among the aromatic polyimide polymer chains via the self-cross-linking of the self-cross-linkable aromatic polyimide polymer comprising both carboxylic acid functional groups and hydroxyl functional groups at 250° C.-350° C. results in good mechanical stability, excellent resistance to hydrocarbon and high concentration of $CO_2$. More importantly, the self-cross-linked aromatic polyimide polymer membrane described in the present invention showed high selectivity and good permeability for a variety of gas separation applications such as $CO_2/CH_4$, $H_2/CH_4$, and $He/CH_4$ separations. For example, a self-cross-linked poly[2,2'-bis-(3,4-dicarboxyphenyl) hexafluoropropane dianhydride-3,3'-dihydroxy-4,4'-diamino-biphenyl-3,5-diaminobenzoic acid]polyimide (abbreviated as poly(6FDA-HAB-DBA)) membrane has $CO_2$ permeance of 7.77 Barrers and high $CO_2/CH_4$ selectivity of 52.5 for $CO_2/CH_4$ separation. This self-cross-linked poly(6FDA-HAB-DBA) membrane has $H_2$ permeance of 38.5 Barrers and high $H_2/CH_4$ selectivity of 260.3 for $H_2/CH_4$ separation. This self-cross-linked poly(6FDA-HAB-DBA) membrane also has He permeance of 51.2 Barrers and high $He/CH_4$ selectivity of 345.8 for $He/CH_4$ separation.

The self-cross-linkable aromatic polyimide polymer described in the present invention comprises a formula (I):

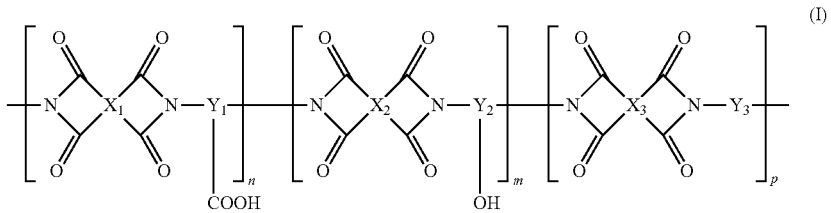

wherein $X_1$, $X_2$, and $X_3$ are selected from the group consisting of

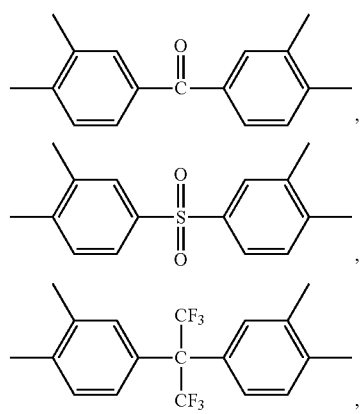

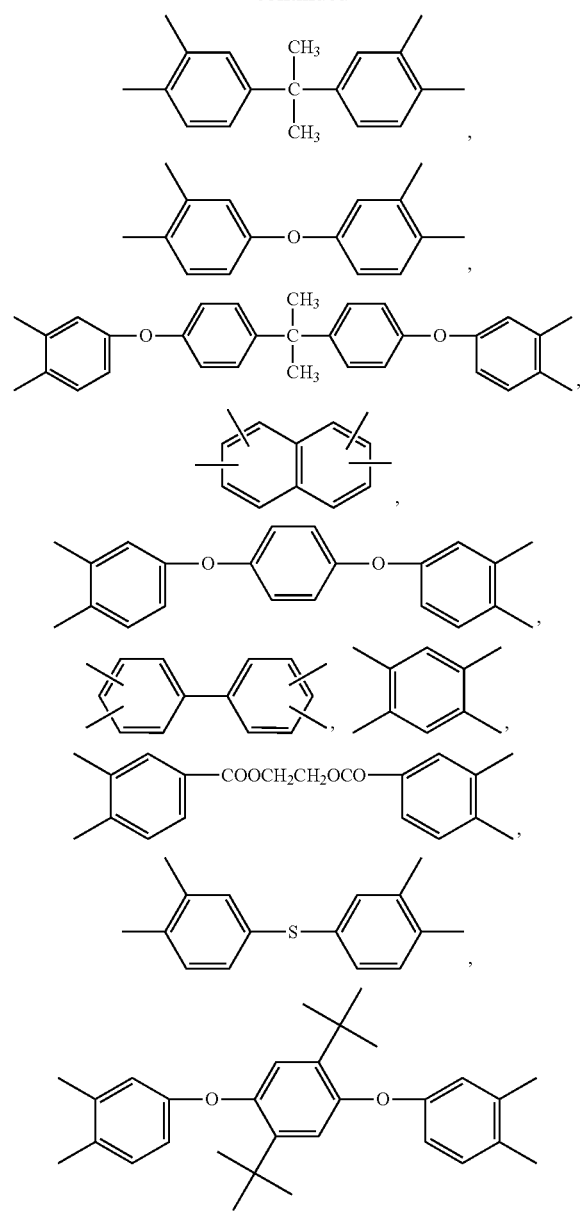
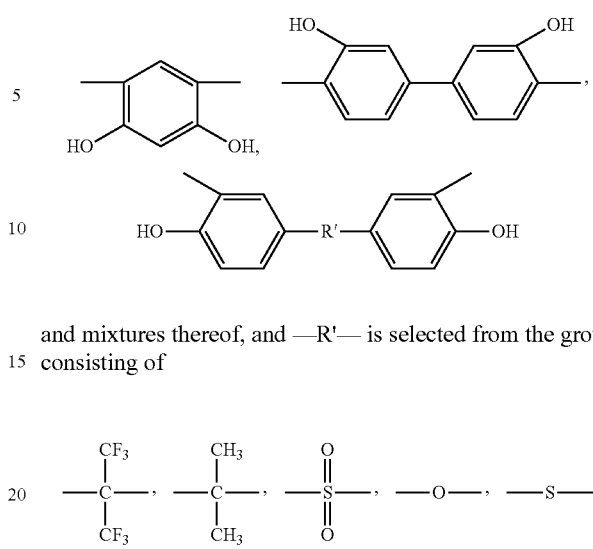
and mixtures thereof, and —R'— is selected from the group consisting of
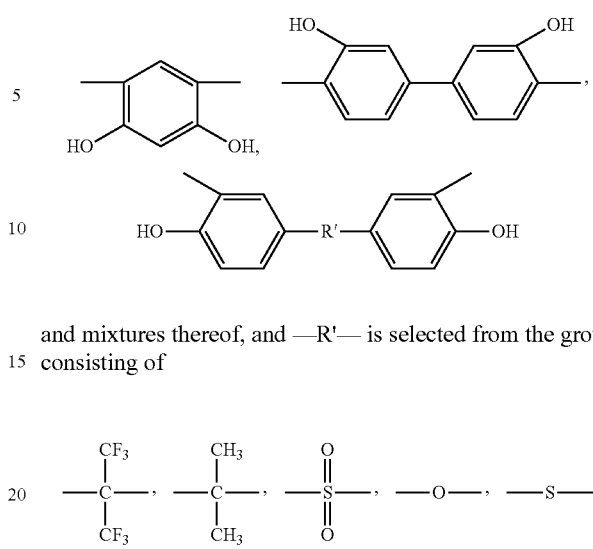
and mixtures thereof; $Y_3$ is selected from the group consisting of
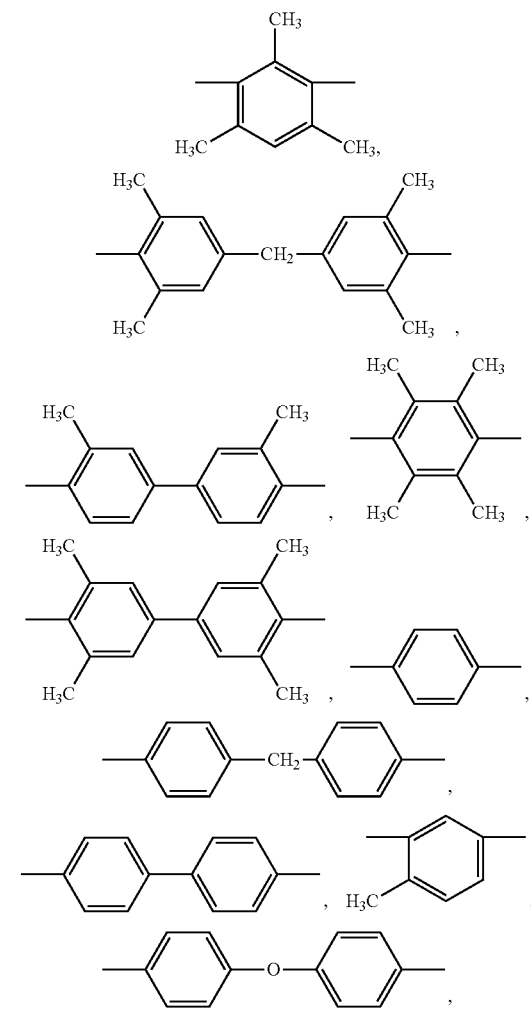
and mixtures thereof, respectively; $X_1$, $X_2$, and $X_3$ are the same or different from each other; $Y_1$—COOH is selected from the group consisting of
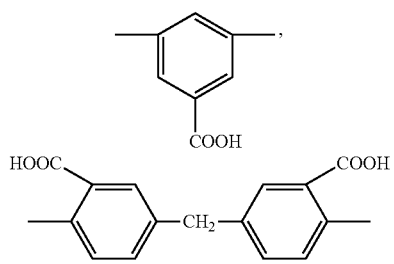
and mixtures thereof; $Y_2$—OH is selected from the group consisting of -continued

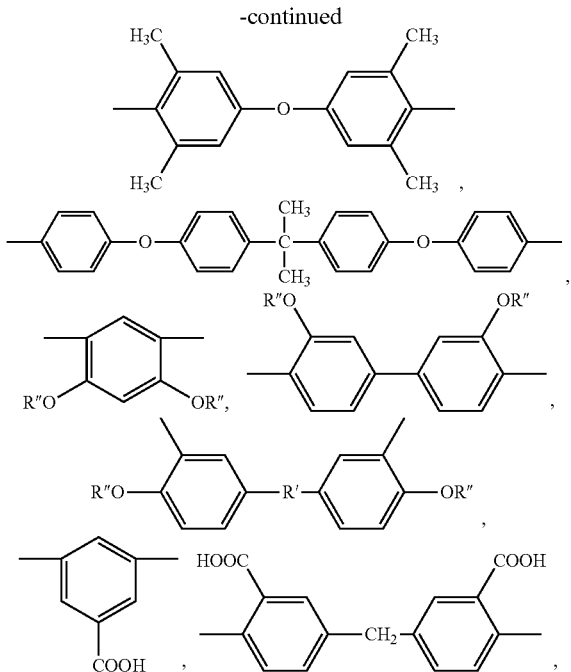

and mixtures thereof, and —R'— is selected from the group consisting of

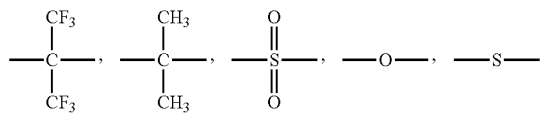

and mixtures thereof, and —R"— is selected from the group consisting of —H, COCH$_3$, and mixtures thereof; n, m, and p are independent integers from 2 to 500; the molar ratio of (n+m)/p is in a range of 1:20 to 1:0; the molar ratio of n/m is in a range of 1:10 to 10:1.

The self-cross-linkable aromatic polyimide polymer comprising both hydroxyl functional groups and carboxylic acid functional groups of the invention may be selected from the group consisting of poly(3,3',4,4'-diphenylsulfone tetracarboxylic dianhydride-3,5-diaminobenzoic acid-3,3'-dihydroxy-4,4'-diamino-biphenyl-2,4,6-trimethyl-m-phenylenediamine)polyimide derived from a polycondensation reaction of 3,3',4,4'-diphenylsulfone tetracarboxylic dianhydride with a mixture of 3,5-diaminobenzoic acid, 3,3'-dihydroxy-4,4'-diamino-biphenyl and 2,4,6-trimethyl-m-phenylenediamine; poly(3,3',4,4'-diphenylsulfone tetracarboxylic dianhydride-3,5-diaminobenzoic acid-3,3'-dihydroxy-4,4'-diamino-biphenyl-3,3',5,5'-tetramethyl-4,4'-methylene dianiline)polyimide derived from a polycondensation reaction of 3,3',4,4'-diphenylsulfone tetracarboxylic dianhydride with a mixture of 3,5-diaminobenzoic acid, 3,3'-dihydroxy-4,4'-diamino-biphenyl and 3,3',5,5'-tetramethyl-4,4'-methylene dianiline; poly(3,3',4,4'-benzophenone tetracarboxylic dianhydride-pyromellitic dianhydride-3,5-diaminobenzoic acid-3,3'-dihydroxy-4,4'-diamino-biphenyl-2,4,6-trimethyl-m-phenylenediamine)polyimide derived from a polycondensation reaction of 3,3',4,4'-benzophenone tetracarboxylic dianhydride and pyromellitic dianhydride with 3,5-diaminobenzoic acid, 3,3'-dihydroxy-4,4'-diamino-biphenyl and 2,4,6-trimethyl-m-phenylenediamine; poly(3,3',4,4'-benzophenone tetracarboxylic dianhydride-pyromellitic dianhydride-3,5-diaminobenzoic acid-3,3'-dihydroxy-4,4'-diamino-biphenyl-3,3',5,5'-tetramethyl-4,4'-methylene dianiline)polyimide derived from a polycondensation reaction of 3,3',4,4'-benzophenone tetracarboxylic dianhydride and pyromellitic dianhydride with 3,5-diaminobenzoic acid, 3,3'-dihydroxy-4,4'-diamino-biphenyl and 3,3',5,5'-tetramethyl-4,4'-methylene dianiline; poly(3,3',4,4'-benzophenone tetracarboxylic dianhydride-3,5-diaminobenzoic acid-3,3'-dihydroxy-4,4'-diamino-biphenyl-3,3',5,5'-tetramethyl-4,4'-methylene dianiline)polyimide derived from a polycondensation reaction of 3,3',4,4'-benzophenone tetracarboxylic dianhydride with 3,5-diaminobenzoic acid, 3,3'-dihydroxy-4,4'-diamino-biphenyl and 3,3',5,5'-tetramethyl-4,4'-methylene dianiline; poly[2,2'-bis-(3,4-dicarboxyphenyl) hexafluoropropane dianhydride-3,5-diaminobenzoic acid-3,3'-dihydroxy-4,4'-diamino-biphenyl]polyimide derived from the polycondensation reaction of 2,2'-bis-(3,4-dicarboxyphenyl) hexafluoropropane dianhydride with a mixture of 3,5-diaminobenzoic acid and 3,3'-dihydroxy-4,4'-diamino-biphenyl; poly[2,2'-bis-(3,4-dicarboxyphenyl) hexafluoropropane dianhydride-2,2-bis(3-amino-4-hydroxyphenyl)-hexafluoropropane-3,5-diaminobenzoic acid] derived from a polycondensation reaction of 2,2'-bis-(3,4-dicarboxyphenyl) hexafluoropropane dianhydride with a mixture of 2,2-bis(3-amino-4-hydroxyphenyl)-hexafluoropropane and 3,5-diaminobenzoic acid; poly[3,3',4,4'-benzophenonetetracarboxylic dianhydride-2,2-bis(3-amino-4-hydroxyphenyl)-hexafluoropropane-3,5-diaminobenzoic acid] derived from a polycondensation reaction of 3,3',4,4'-benzophenonetetracarboxylic dianhydride with a mixture of 2,2-bis(3-amino-4-hydroxyphenyl)-hexafluoropropane and 3,5-diaminobenzoic acid; poly[4,4'-oxydiphthalic anhydride-2,2-bis(3-amino-4-hydroxyphenyl)-hexafluoropropane-3,5-diaminobenzoic acid] derived from a polycondensation reaction of 4,4'-oxydiphthalic anhydride with a mixture of 2,2-bis(3-amino-4-hydroxyphenyl)-hexafluoropropane and 3,5-diaminobenzoic acid; poly[3,3',4,4'-diphenylsulfone tetracarboxylic dianhydride-2,2-bis(3-amino-4-hydroxyphenyl)-hexafluoropropane-3,5-diaminobenzoic acid] derived from a polycondensation reaction of 3,3',4,4'-diphenylsulfone tetracarboxylic dianhydride with a mixture of 2,2-bis(3-amino-4-hydroxyphenyl)-hexafluoropropane and 3,5-diaminobenzoic acid; poly[2,2'-bis-(3,4-dicarboxyphenyl) hexafluoropropane dianhydride-3,3',4,4'-benzophenonetetracarboxylic dianhydride-2,2-bis(3-amino-4-hydroxyphenyl)-hexafluoropropane-3,5-diaminobenzoic acid] derived from a polycondensation reaction of 2,2'-bis-(3,4-dicarboxyphenyl) hexafluoropropane dianhydride and 3,3',4,4'-benzophenonetetracarboxylic dianhydride with a mixture of 2,2-bis(3-amino-4-hydroxyphenyl)-hexafluoropropane and 3,5-diaminobenzoic acid; poly[4,4'-oxydiphthalic anhydride-2,2-bis(3-amino-4-hydroxyphenyl)-hexafluoropropane-3,3'-dihydroxy-4,4'-diamino-biphenyl-3,5-diaminobenzoic acid] derived from a polycondensation reaction of 4,4'-oxydiphthalic anhydride with a mixture of 2,2-bis(3-amino-4-hydroxyphenyl)-hexafluoropropane, 3,3'-dihydroxy-4,4'-diamino-biphenyl and 3,5-diaminobenzoic acid; poly[3,3',4,4'-benzophenonetetracarboxylic dianhydride-2,2-bis(3-amino-4-hydroxyphenyl)-hexafluoropropane-3,3'-dihydroxy-4,4'-diamino-biphenyl-3,5-diaminobenzoic acid] derived from a polycondensation reaction of 3,3',4,4'-benzophenonetetracarboxylic dianhydride with a mixture of 2,2-bis(3-amino-4-hydroxyphenyl)-hexafluoropropane, 3,3'-dihydroxy-4,4'-diamino-biphenyl, and 3,5-diaminobenzoic acid.

The self-cross-linked aromatic polyimide polymer described in the present invention comprises a plurality of repeating units of formula (II):

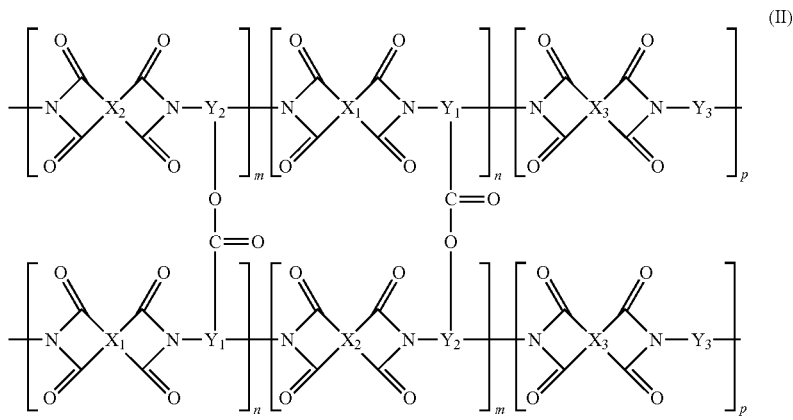

wherein $X_1$, $X_2$, and $X_3$ are selected from the group consisting of

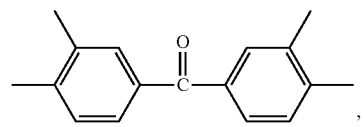
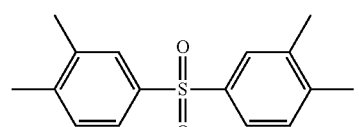
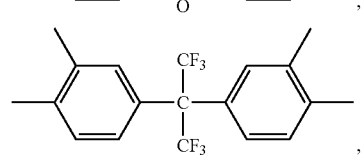
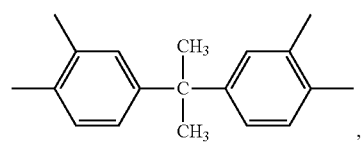
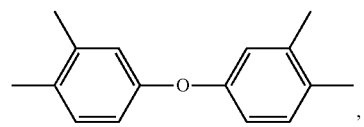
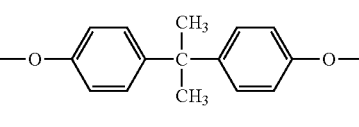
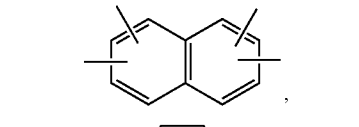
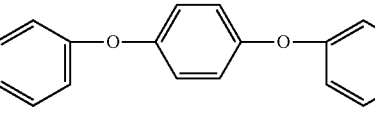

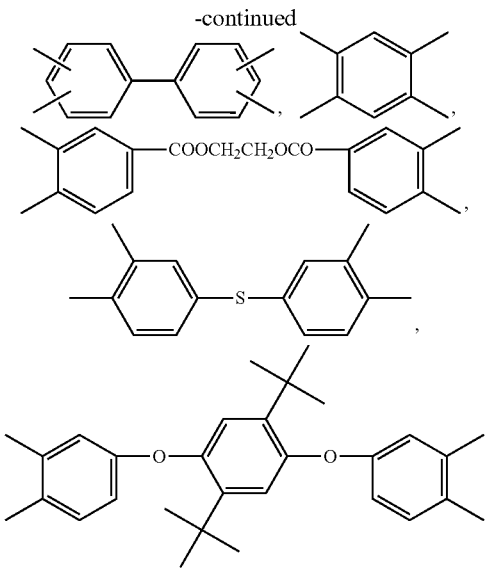

and mixtures thereof, respectively; $X_1$, $X_2$, and $X_3$ are the same or different from each other; $Y_1$—CO— is selected from the group consisting of

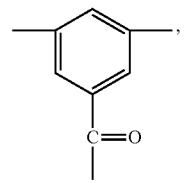

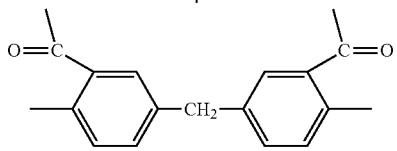

and mixtures thereof; $Y_2$—O— is selected from the group consisting of

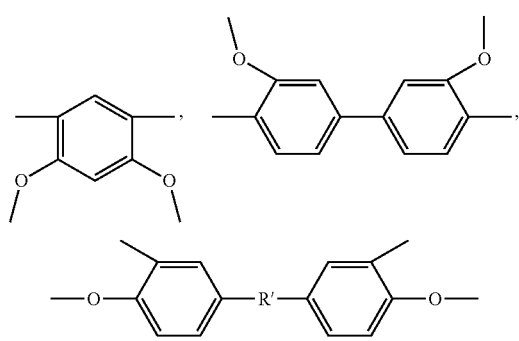

and mixtures thereof, and —R'— is selected from the group consisting of

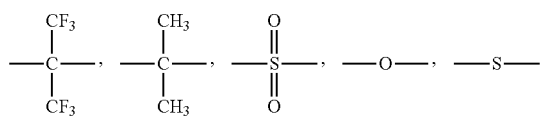

and mixtures thereof; $Y_3$ is selected from the group consisting of

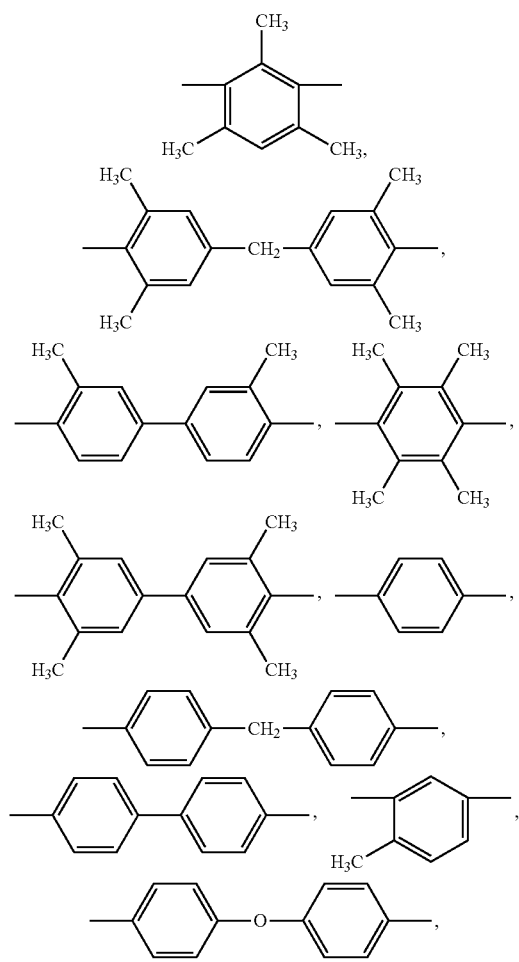

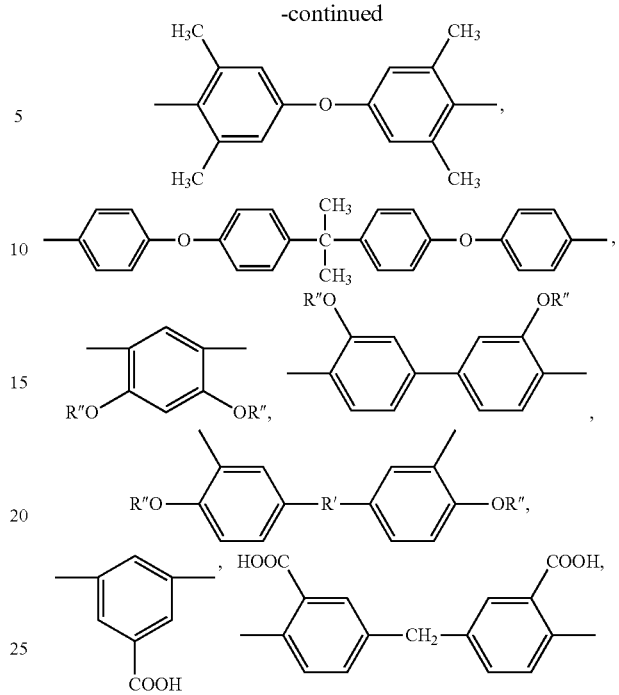

and mixtures thereof, and —R'— is selected from the group consisting of

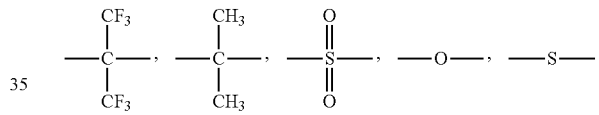

and mixtures thereof, and —R"— is selected from the group consisting of —H, COCH$_3$, and mixtures thereof; n, m, and p are independent integers from 2 to 500; the molar ratio of (n+m)/p is in a range of 1:20 to 1:0; the molar ratio of n/m is in a range of 1:10 to 10:1.

The self-cross-linkable aromatic polyimide polymer described in the present invention has a weight average molecular weight in the range of 10,000 to 1,000,000 Daltons, preferably between 70,000 to 500,000 Daltons.

The self-cross-linkable aromatic polyimide polymer membrane and the self-cross-linked aromatic polyimide polymer membrane made from the self-cross-linkable aromatic polyimide polymer described in the present invention can be fabricated into any convenient geometry such as flat sheet (or spiral wound), tube, or hollow fiber.

The present invention provides a method for the production of the high hydrocarbon resistant self-cross-linked aromatic polyimide polymer membrane by: 1) fabricating a self-cross-linkable aromatic polyimide polymer membrane from the self-cross-linkable aromatic polyimide polymer comprising both hydroxyl functional groups and carboxylic acid functional groups; 2) cross-linking the self-cross-linkable aromatic polyimide polymer membrane by heating the membrane at 250° C. to 300° C. under an inert atmosphere, such as argon, nitrogen, or vacuum. In some cases, a membrane coating step is added after step 1) and before step 2) by coating the selective layer surface of the self-cross-linked aromatic polyimide polymer membrane with a thin layer of high permeability material such as a polysiloxane, a fluoro-polymer, a thermally curable silicone rubber, or a UV radiation curable epoxy silicone.

The invention provides a process for separating at least one gas from a mixture of gases using the self-cross-linked aromatic polyimide polymer membrane described in the present invention, the process comprising: (a) providing a self-cross-linked aromatic polyimide polymer membrane described in the present invention which is permeable to said at least one gas; (b) contacting the mixture on one side of the self-cross-linked aromatic polyimide polymer membrane described in the present invention to cause said at least one gas to permeate the membrane; and (c) removing from the opposite side of the membrane a permeate gas composition comprising a portion of said at least one gas which permeated said membrane.

The self-cross-linked aromatic polyimide polymer membrane described in the present invention is especially useful in the purification, separation or adsorption of a particular species in the liquid or gas phase. In addition to separation of pairs of gases, the self-cross-linked aromatic polyimide polymer membrane described in the present invention may, for example, be used for the desalination of water by reverse osmosis or for the separation of proteins or other thermally unstable compounds, e.g. in the pharmaceutical and biotechnology industries. The self-cross-linked aromatic polyimide polymer membrane described in the present invention may also be used in fermenters and bioreactors to transport gases into the reaction vessel and transfer cell culture medium out of the vessel. Additionally, the self-cross-linked aromatic polyimide polymer membrane described in the present invention may be used for the removal of microorganisms from air or water streams, water purification, ethanol production in a continuous fermentation/membrane pervaporation system, and in detection or removal of trace compounds or metal salts in air or water streams.

The self-cross-linked aromatic polyimide polymer membrane described in the present invention is especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of He, $CO_2$ or $H_2S$ from natural gas, $H_2$ from $N_2$, $CH_4$, and Ar in ammonia purge gas streams, $H_2$ recovery in refineries, olefin/paraffin separations such as propylene/propane separation, xylene separations, iso/normal paraffin separations, liquid natural gas separations, $C_2$+ hydrocarbon recovery. Any given pair or group of gases that differ in molecular size, for example nitrogen and oxygen, carbon dioxide and methane, hydrogen and methane or carbon monoxide, helium and methane, can be separated using the self-cross-linked aromatic polyimide polymer membrane described in the present invention. More than two gases can be removed from a third gas. For example, some of the gas components which can be selectively removed from a raw natural gas using the self-cross-linked aromatic polyimide polymer membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 70 kPa or as high as 14.5 MPa (about 10 psi or as high as about 2100 psi) depending on many factors such as the particular membrane used, the flow rate of the inlet stream and the availability of a compressor to compress the permeate stream if such compression is desired. Differential pressure greater than about 14.5 MPa (2100 psi) may rupture the membrane. A differential pressure of at least 0.7 MPa (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about −50° to about 150° C. More preferably, the effective operating temperature of the self-cross-linked aromatic polyimide polymer membrane of the present invention will range from about −20° to about 100° C., and most preferably, the effective operating temperature of the membranes of the present invention will range from about 25° to about 100° C.

The self-cross-linked aromatic polyimide polymer membrane described in the present invention are also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which the self-cross-linked aromatic polyimide polymer membrane described in the present invention may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The self-cross-linked aromatic polyimide polymer membrane described in the present invention may incorporate a species that adsorbs strongly to certain gases (e.g. cobalt porphyrins or phthalocyanines for $O_2$ or silver (I) for ethane) to facilitate their transport across the membrane.

The self-cross-linked aromatic polyimide polymer membrane described in the present invention also has immediate application to concentrate olefin in a paraffin/olefin stream for olefin cracking application. For example, the self-cross-linked aromatic polyimide polymer membrane described in the present invention can be used for propylene/propane separation to increase the concentration of the effluent in a catalytic dehydrogenation reaction for the production of propylene from propane and isobutylene from isobutane. Therefore, the number of stages of a propylene/propane splitter that is required to get polymer grade propylene can be reduced. Another application for the self-cross-linked aromatic polyimide polymer membrane described in the present invention is for separating isoparaffin and normal paraffin in light paraffin isomerization and MaxEne™, a process from UOP LLC, Des Plaines, Ill., for enhancing the concentration of normal paraffin (n-paraffin) in the naphtha cracker feedstock, which can be then converted to ethylene.

The self-cross-linked aromatic polyimide polymer membrane described in the present invention can also be operated at high temperature to provide the sufficient dew point margin for natural gas upgrading (e.g, $CO_2$ removal from natural gas). The self-cross-linked aromatic polyimide polymer membrane described in the present invention can be used in either a single stage membrane or as the first or/and second stage membrane in a two stage membrane system for natural gas upgrading.

The self-cross-linked aromatic polyimide polymer membrane described in the present invention may also be used in the separation of liquid mixtures by pervaporation, such as in the removal of organic compounds (e.g., alcohols, phenols, chlorinated hydrocarbons, pyridines, ketones) from water such as aqueous effluents or process fluids. A membrane which is ethanol-selective would be used to increase the ethanol concentration in relatively dilute ethanol solutions (5-10% ethanol) obtained by fermentation processes. Another liquid phase separation example using the self-cross-linked aromatic polyimide polymer membrane described in the present invention is the deep desulfurization of gasoline and diesel fuels by a pervaporation membrane process similar to the process described in U.S. Pat. No. 7,048,846, incorporated by reference herein in its entirety. The self-cross-linked aromatic polyimide polymer membrane described in the present invention that are selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g. to separate isomers of organic compounds. Mixtures of organic compounds which may be separated using the self-cross-linked aromatic polyimide polymer membrane described in the present invention include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

EXAMPLES

The following examples are provided to illustrate one or more preferred embodiments of the invention, but are not limited embodiments thereof. Numerous variations can be made to the following examples that lie within the scope of the invention.

Example 1

Synthesis of self-cross-linkable aromatic polyimide poly[2,2'-bis-(3,4-dicarboxyphenyl) hexafluoropropane dianhydride-3,5-diaminobenzoic acid-3,3'-dihydroxy-4,4'-diamino-biphenyl] (abbreviated as poly (6FDA-HAB-DBA))

Poly(6FDA-HAB-DBA)polyimide was synthesized from polycondensation reaction of 2,2'-bis-(3,4-dicarboxyphenyl) hexafluoropropane dianhydride (6FDA) with a mixture of 3,5-diaminobenzoic acid (DBA) and 3,3'-dihydroxy-4,4'-diamino-biphenyl (HAB) in DMAc polar solvent by a two-step process involving the formation of the poly(amic acid) followed by a solution imidization process. Acetic anhydride was used as the dehydrating agent and pyridine was used as the imidization catalyst for the solution imidization reaction. For example, a 1 L three-neck round-bottom flask equipped with a nitrogen inlet and a mechanical stirrer was charged with 25.9 g (0.12 mol) of HAB, 4.56 g (0.03 mol) of DBA and 121.8 g of DMAc. Once HAB and DBA were fully dissolved, 66.6 g of 6FDA (0.15 mol) was added to the HAB and DBA solution in the flask. Then 428 g of DMAc was added to the solution. The reaction mixture was mechanically stirred for 24 hours at ambient temperature to give a viscous poly(amic acid) solution. Then 32.1 g (0.315 mol) of acetic anhydride and 49.8 g (0.63 mol) of pyridine were added to the reaction mixture under stirring. The reaction mixture was mechanically stirred for an additional 3 hour at 95° C. to yield the poly(6FDA-HAB-DBA)polyimide. The poly(6FDA-HAB-DBA)polyimide product in a power form was recovered by adding methanol to the reaction mixture under mechanical stirring. The resultant poly(6FDA-HAB-DBA)polyimide powder was then thoroughly rinsed with methanol and dried in a vacuum oven at 110° C. for 24 hours.

Example 2

Preparation and Evaluation of Self-Cross-Linked Aromatic Polyimide Membrane from Poly(6FDA-HAB-DBA) Aromatic Polyimide 5.0 g of self-cross-linkable poly(6FDA-HAB-DBA)polyimide synthesized in Example 1 was dissolved in 20.0 g of NMP solvent. The mixture was mechanically stirred for 2 hours to form a homogeneous casting dope. The resulting homogeneous casting dope was allowed to degas overnight. The self-cross-linkable poly(6FDA-HAB-DBA) membrane was prepared from the bubble free casting dope on a clean glass plate using a doctor knife with a 15-mil gap. The membrane together with the glass plate was then put into a vacuum oven. The solvents were removed by slowly increasing the vacuum and the temperature of the vacuum oven. Finally, the membrane was heated at 200° C. under vacuum for 48 hours to completely remove the residual solvents. The dried self-cross-linkable poly(6FDA-HAB-DBA) membrane was heated at 300° C. under $N_2$ for 10 min to form the self-cross-linked poly(6FDA-HAB-DBA) membrane via esterification reaction between the carboxylic acid groups and the hydroxyl groups on poly(6FDA-HAB-DBA) polymer chains. The self-cross-linked poly(6FDA-HAB-DBA) aromatic polyimide membrane became insoluble in organic solvents.

The self-cross-linked poly(6FDA-HAB-DBA) aromatic polyimide membrane is useful for a variety of gas separation applications such as $CO_2/CH_4$, $H_2/CH_4$, and $He/CH_4$ separations. The membrane was tested for $CO_2/CH_4$, $H_2/CH_4$, and $He/CH_4$ separations at 50° C. under 791 kPa (100 psig) pure single feed gas pressure. The results show that this self-cross-linked poly(6FDA-HAB-DBA) aromatic polyimide membrane has $CO_2$ permeance of 7.77 Barrers and high $CO_2/CH_4$ selectivity of 52.5 for $CO_2/CH_4$ separation (Table 1). This self-cross-linked poly(6FDA-HAB-DBA) membrane has $H_2$ permeance of 38.5 Barrers and $H_2/CH_4$ selectivity of 260.3 for $H_2/CH_4$ separation (Table 2). This self-cross-linked poly(6FDA-HAB-DBA) membrane also has He permeance of 51.2 Barrers and $He/CH_4$ selectivity of 345.8 for $He/CH_4$ separation (Table 3).

TABLE 1

Pure gas permeation test results of self-cross-linkable poly(6FDA-HAB-DBA) membrane and self-cross-linked poly(6FDA-HAB-DBA) membrane for $CO_2/CH_4$ Separation[a]

| Membrane | $P_{CO2}$ (Barrer) | $\alpha_{CO2/CH4}$ |
|---|---|---|
| Self-cross-linkable poly(6FDA-HAB-DBA) | 5.13 | 49.3 |
| Self-cross-linked poly(6FDA-HAB-DBA) | 7.77 | 52.5 |

[a]$P_{CO2}$ and $P_{CH4}$ were tested at 50° C. and 690 kPa (100 psig);
1 Barrer = $10^{-10}$ $cm^3$(STP) · $cm/cm^2$ · sec · cmHg.

TABLE 2

Pure gas permeation test results of self-cross-linkable poly(6FDA-HAB-DBA) membrane and self-cross-linked poly(6FDA-HAB-DBA) membrane for $H_2/CH_4$ Separation[a]

| Membrane | $P_{H2}$ (Barrer) | $\alpha_{H2/CH4}$ |
|---|---|---|
| Self-cross-linkable poly(6FDA-HAB-DBA) | 22.9 | 220.1 |
| Self-cross-linked poly(6FDA-HAB-DBA) | 38.5 | 260.3 |

[a]$P_{H2}$ and $P_{CH4}$ were tested at 50° C. and 690 kPa (100 psig); 1 Barrer = $10^{-10}$ cm$^3$(STP) · cm/cm$^2$ · sec · cmHg.

TABLE 3

Pure gas permeation test results of self-cross-linked poly(6FDA-HAB-DBA) membrane for $He/CH_4$ Separation[a]

| Membrane | $P_{He}$ (Barrer) | $\alpha_{He/CH4}$ |
|---|---|---|
| Self-cross-linked poly(6FDA-HAB-DBA) | 51.2 | 345.8 |

[a]$P_{He}$ and $P_{CH4}$ were tested at 50° C. and 690 kPa (100 psig); Barrer = $10^{-10}$ cm$^3$(STP) · cm/cm$^2$ · sec · cmHg.

Example 3

Synthesis of self-cross-linkable aromatic polyimide poly(3,3',4,4'-diphenylsulfone tetracarboxylic dianhydride-3,5-diaminobenzoic acid-3,3'-dihydroxy-4,4'-diamino-biphenyl-3,3',5,5'-tetramethyl-4,4'-methylene dianiline)polyimide (abbreviated as poly(DSDA-DBA-HAB-TMMDA-1-2-3))

Poly(DSDA-DBA-HAB-TMMDA-1-2-3)polyimide was synthesized from polycondensation reaction of 3,3',4,4'-diphenylsulfone tetracarboxylic dianhydride (DSDA) with a mixture of 3,5-diaminobenzoic acid (DBA), 3,3'-dihydroxy-4,4'-diamino-biphenyl (HAB) and 3,3',5,5'-tetramethyl-4,4'-methylene dianiline (TMMDA) in DMAc polar solvent by a two-step process involving the formation of the poly(amic acid) followed by a solution imidization process. Acetic anhydride was used as the dehydrating agent and pyridine was used as the imidization catalyst for the solution imidization reaction. For example, a 1 L three-neck round-bottom flask equipped with a nitrogen inlet and a mechanical stirrer was charged with 13.0 g (0.06 mol) of HAB, 4.56 g (0.03 mol) of DBA, 22.9 g (0.09 mol) of TMMDA and 160 g of DMAc. Once HAB, DBA, and TMMDA were fully dissolved, 66.1 g (0.185 mol) of DSDA was added to the diamine solution in the flask. Then 260 g of DMAc was added to the solution. The reaction mixture was mechanically stirred for 24 hours at ambient temperature to give a viscous poly(amic acid) solution. Then 38.6 g of acetic anhydride and 59.7 g of pyridine were added to the reaction mixture under stirring. The reaction mixture was mechanically stirred for an additional 3 hour at 95° C. to yield the poly(DSDA-DBA-HAB-TMMDA-1-2-3)polyimide. The poly(DSDA-DBA-HAB-TMMDA-1-2-3) polyimide product in a power form was recovered by adding methanol to the reaction mixture under mechanical stirring. The resultant poly(DSDA-DBA-HAB-TMMDA-1-2-3) polyimide powder was then thoroughly rinsed with methanol and dried in a vacuum oven at 110° C. for 24 hours.

Example 4

Preparation and Evaluation of Self-Cross-Linked Aromatic Polyimide Membrane from Poly(DSDA-DBA-HAB-TMMDA-1-2-3)Polyimide 5.0 g of self-cross-linkable poly(DSDA-DBA-HAB-TMMDA-1-2-3)polyimide synthesized in Example 4 was dissolved in 20.0 g of NMP solvent. The mixture was mechanically stirred for 2 hours to form a homogeneous casting dope. The resulting homogeneous casting dope was allowed to degas overnight. The self-cross-linkable poly(DSDA-DBA-HAB-TMMDA-1-2-3) membrane was prepared from the bubble free casting dope on a clean glass plate using a doctor knife with a 15-mil gap. The membrane together with the glass plate was then put into a vacuum oven. The solvents were removed by slowly increasing the vacuum and the temperature of the vacuum oven. Finally, the membrane was heated at 200° C. under vacuum for 48 hours to completely remove the residual solvents. The dried self-cross-linkable poly(DSDA-DBA-HAB-TMMDA-1-2-3) membrane was heated at 300° C. under $N_2$ for 10 min to form the self-cross-linked poly(DSDA-DBA-HAB-TMMDA-1-2-3) membrane via esterification reaction between the carboxylic acid groups and the hydroxyl groups on poly(DSDA-DBA-HAB-TMMDA-1-2-3) polymer chains. The self-cross-linked poly(DSDA-DBA-HAB-TMMDA-1-2-3) aromatic polyimide membrane became insoluble in any organic solvents.

The self-cross-linked poly(DSDA-DBA-HAB-TMMDA-1-2-3) aromatic polyimide membrane was tested for $CO_2/CH_4$ and $H_2/CH_4$ separations at 50° C. under 791 kPa (100 psig) pure single feed gas pressure. The results show that this self-cross-linked poly(DSDA-DBA-HAB-TMMDA-1-2-3) aromatic polyimide membrane has $CO_2$ permeance of 3.4 Barrers and high $CO_2/CH_4$ selectivity of 34 for $CO_2/CH_4$ separation (Table 4). This self-cross-linked poly(DSDA-DBA-HAB-TMMDA-1-2-3) membrane also has $H_2$ permeance of 16.1 Barrers and $H_2/CH_4$ selectivity of 159 for $H_2/CH_4$ separation (Table 5).

TABLE 4

Pure gas permeation test results of self-cross-linkable poly(DSDA-DBA-HAB-TMMDA-1-2-3) membrane and self-cross-linked poly(DSDA-DBA-HAB-TMMDA-1-2-3) membrane for $CO_2/CH_4$ Separation[a]

| Membrane | $P_{CO2}$ (Barrer) | $\alpha_{CO2/CH4}$ |
|---|---|---|
| Self-cross-linkable poly(DSDA-DBA-HAB-TMMDA-1-2-3) | 3.66 | 31.0 |
| Self-cross-linked poly(DSDA-DBA-HAB-TMMDA-1-2-3) | 3.43 | 34.0 |

[a]$P_{CO2}$ and $P_{CH4}$ were tested at 50° C. and 690 kPa (100 psig); 1 Barrer = $10^{-10}$ cm$^3$(STP) · cm/cm$^2$ · sec · cmHg.

TABLE 5

Pure gas permeation test results of self-cross-linkable poly(DSDA-DBA-HAB-TMMDA-1-2-3) membrane and self-cross-linked poly(DSDA-DBA-HAB-TMMDA-1-2-3) membrane for $H_2/CH_4$ Separation[a]

| Membrane | $P_{H2}$ (Barrer) | $\alpha_{H2/CH4}$ |
|---|---|---|
| Self-cross-linkable poly(DSDA-DBA-HAB-TMMDA-1-2-3) | 13.9 | 118.0 |
| Self-cross-linked poly(DSDA-DBA-HAB-TMMDA-1-2-3) | 16.1 | 159.8 |

[a]$P_{H2}$ and $P_{CH4}$ were tested at 50° C. and 690 kPa (100 psig); 1 Barrer = $10^{-10}$ cm$^3$(STP) · cm/cm$^2$ · sec · cmHg.

Example 5

Preparation of Self-Cross-Linked Poly(6FDA-HAB-DBA) Hollow Fiber Membrane

A hollow fiber spinning dope containing 29 g of poly(6FDA-HAB-DBA)polyimide, 59 g of N-methyl-2-pyrrolidone (NMP), 8 g of 1,3-dioxolane, and 2 g of isopropanol was prepared. The spinning dope was extruded at a flow rate of 2.6 mL/min through a spinneret at 50° C. spinning temperature. A bore fluid containing 10% by weight of water in NMP was injected to the bore of the fiber at a flow rate of 0.8 mL/min simultaneously with the extruding of the spinning dope. The nascent fiber traveled through an air gap length of 15 cm at room temperature with a humidity of 45%, and then was immersed into a water coagulant bath at 21° C. and wound up at a rate of 23 m/min. The water-wet fiber was annealed in a hot water bath at 85° C. for 30 minutes. The annealed water-wet fiber was then sequentially exchanged with methanol and hexane for three times and for 30 minutes each time, followed by drying at 100° C. in an oven for 1 hour to form self-cross-linkable poly(6FDA-HAB-DBA) hollow fiber membrane. The self-cross-linkable poly(6FDA-HAB-DBA) hollow fiber membrane was thermally heated from 50° C. to 300° C. at a heating rate of 10° C./min under $N_2$ flow. The membrane was hold for 10 min at 300° C. and then cooled down to 50° C. at a cooling rate of 15° C./min under $N_2$ flow to yield self-cross-linked poly(6FDA-HAB-DBA) hollow fiber membrane.

Example 6

Evaluation of Self-Cross-Linked Poly(6FDA-HAB-DBA) Hollow Fiber Membrane for $CO_2/CH_4$ Separation The self-cross-linked poly(6FDA-HAB-DBA) hollow fiber membrane was tested for $CO_2/CH_4$ separation at 50° C. under 791 kPa (100 psig) single-feed gas pressure with the feed on the shell side of the hollow fibers. The membrane showed $CO_2$ permeance of 57 GPU (1 GPU=$10^{-6}$ cm$^3$ (STP)/cm$^2$ s (cm Hg)) and $CO_2/CH_4$ selectivity of 45.

An embodiment of the invention involves self-cross-linkable aromatic polyimide polymer comprising both hydroxyl functional groups and carboxylic acid functional groups.

The self-cross-linkable aromatic polyimide polymer of the invention includes polymers comprising a formula (I)

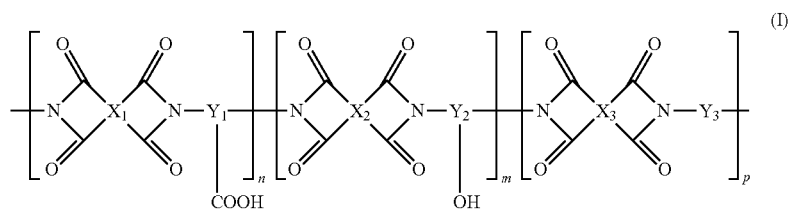
(I)

wherein $X_1$, $X_2$, and $X_3$ are selected from the group consisting of

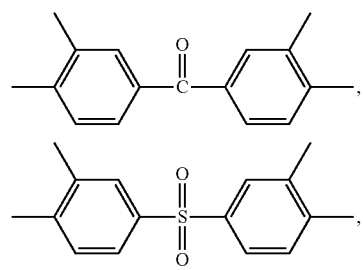

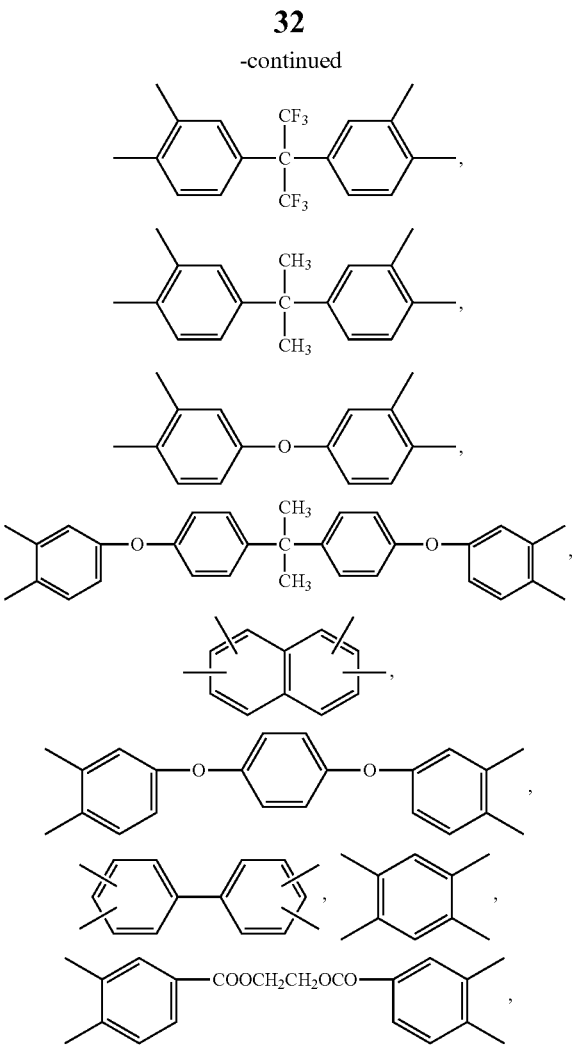

-continued

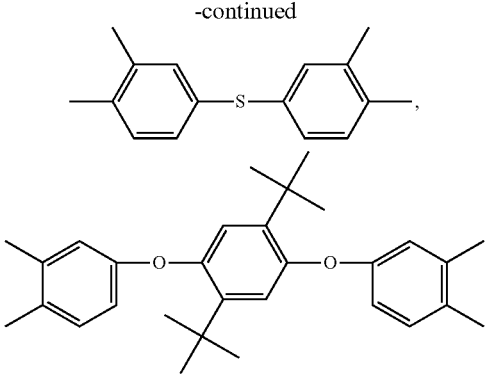

and mixtures thereof, respectively; $X_1$, $X_2$, and $X_3$ are the same or different from each other; $Y_1$—COOH is selected from the group consisting of

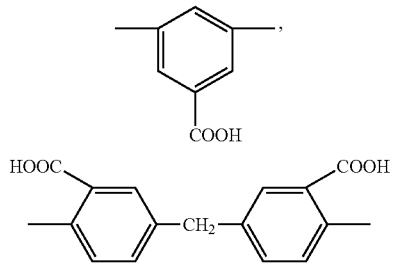

and mixtures thereof; $Y_2$—OH is selected from the group consisting of

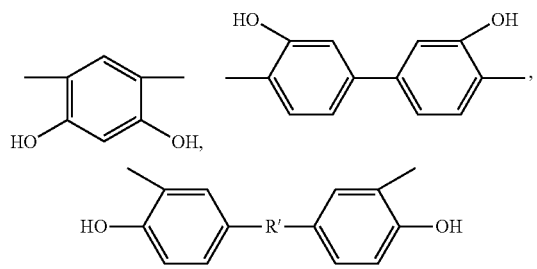

and mixtures thereof, and —R'— is selected from the group consisting of

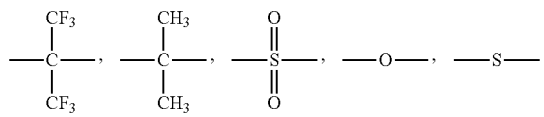

and mixtures thereof; $Y_3$ is selected from the group consisting of

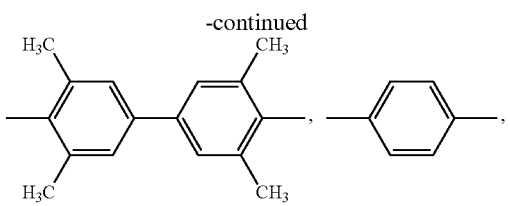

-continued

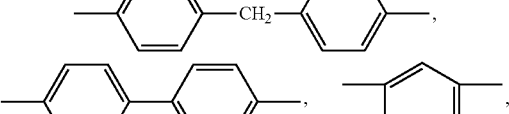

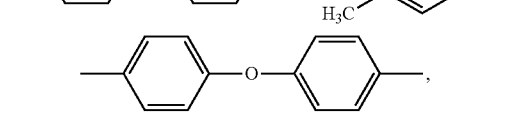

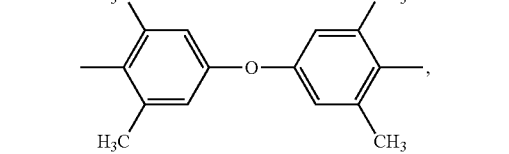

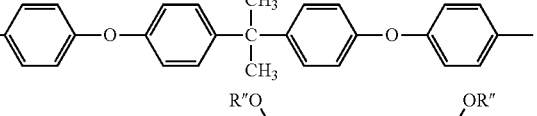

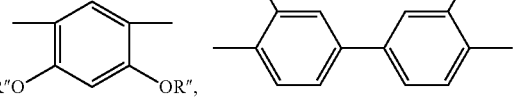

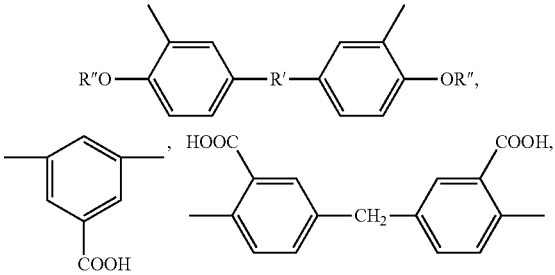

and mixtures thereof, and —R'— is selected from the group consisting of

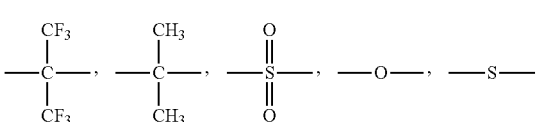

and mixtures thereof, and —R''— is selected from the group consisting of —H, COCH$_3$, and mixtures thereof n, m, and p are independent integers from 2 to 500; the molar ratio of (n+m)/p is in a range of 1:20 to 1:0; the molar ratio of n/m is in a range of 1:10 to 10:1.

An embodiment of the invention includes a membrane comprising the self-cross-linkable aromatic polyimide formula (I) set forth above. In an embodiment of the invention, the self-cross-linkable aromatic polyimide polymer includes $X_1$, $X_2$, and $X_3$ that are selected from the group consisting of

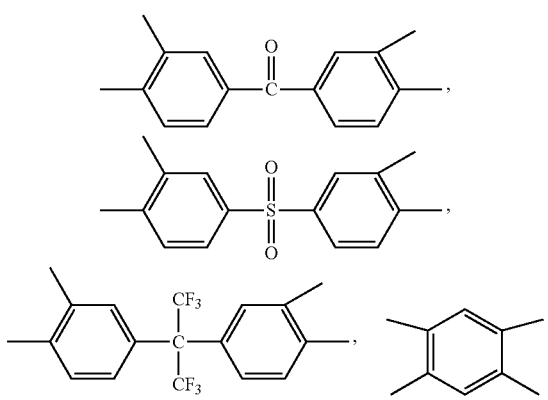

and mixtures thereof. In some embodiments, $Y_1$—COOH is

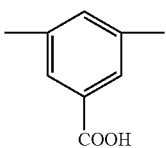

In some embodiments of the invention, $Y_2$—OH is

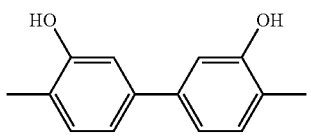

In some embodiments of the invention, $Y_3$ is selected from the group consisting of

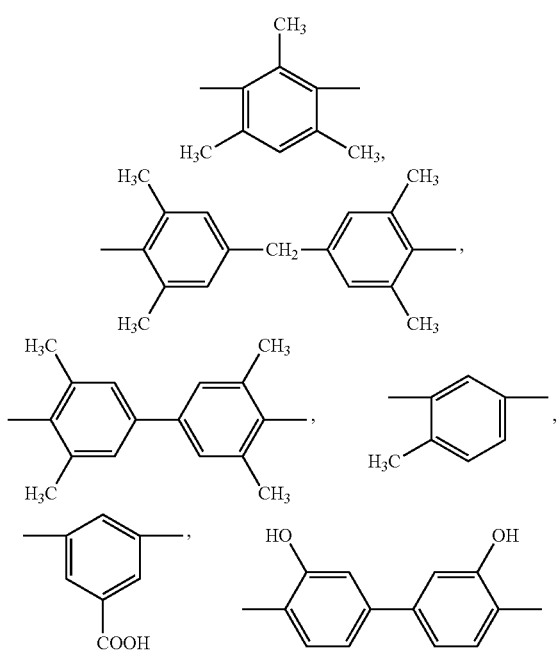

and mixtures thereof

The self-cross-linkable aromatic polyimide polymer of the invention comprises both hydroxyl functional groups and carboxylic acid functional groups of the invention wherein said polymer is selected from the group consisting of poly(3,3',4,4'-diphenylsulfone tetracarboxylic dianhydride-3,5-diaminobenzoic acid-3,3'-dihydroxy-4,4'-diamino-biphenyl-2,4,6-trimethyl-m-phenylenediamine)polyimide derived from a polycondensation reaction of 3,3',4,4'-diphenylsulfone tetracarboxylic dianhydride with a mixture of 3,5-diaminobenzoic acid, 3,3'-dihydroxy-4,4'-diamino-biphenyl and 2,4,6-trimethyl-m-phenylenediamine; poly(3,3',4,4'-diphenylsulfone tetracarboxylic dianhydride-3,5-diaminobenzoic acid-3,3'-dihydroxy-4,4'-diamino-biphenyl-3,3',5,5'-tetramethyl-4,4'-methylene dianiline)polyimide derived from a polycondensation reaction of 3,3',4,4'-diphenylsulfone tetracarboxylic dianhydride with a mixture of 3,5-diaminobenzoic acid, 3,3'-dihydroxy-4,4'-diamino-biphenyl and 3,3',5,5'-tetramethyl-4,4'-methylene dianiline; poly(3,3',4,4'-benzophenone tetracarboxylic dianhydride-pyromellitic dianhydride-3,5-diaminobenzoic acid-3,3'-dihydroxy-4,4'-diamino-biphenyl-2,4,6-trimethyl-m-phenylenediamine) polyimide derived from a polycondensation reaction of 3,3',4,4'-benzophenone tetracarboxylic dianhydride and pyromellitic dianhydride with 3,5-diaminobenzoic acid, 3,3'-dihydroxy-4,4'-diamino-biphenyl and 2,4,6-trimethyl-m-phenylenediamine; poly(3,3',4,4'-benzophenone tetracarboxylic dianhydride-pyromellitic dianhydride-3,5-diaminobenzoic acid-3,3'-dihydroxy-4,4'-diamino-biphenyl-3,3',5,5'-tetramethyl-4,4'-methylene dianiline)polyimide derived from a polycondensation reaction of 3,3',4,4'-benzophenone tetracarboxylic dianhydride and pyromellitic dianhydride with 3,5-diaminobenzoic acid, 3,3'-dihydroxy-4,4'-diamino-biphenyl and 3,3',5,5'-tetramethyl-4,4'-methylene dianiline; poly(3,3',4,4'-benzophenone tetracarboxylic dianhydride-3,5-diaminobenzoic acid-3,3'-dihydroxy-4,4'-diamino-biphenyl-3,3',5,5'-tetramethyl-4,4'-methylene dianiline)polyimide derived from a polycondensation reaction of 3,3',4,4'-benzophenone tetracarboxylic dianhydride with 3,5-diaminobenzoic acid, 3,3'-dihydroxy-4,4'-diamino-biphenyl and 3,3',5,5'-tetramethyl-4,4'-methylene dianiline; poly[2,2'-bis-(3,4-dicarboxyphenyl) hexafluoropropane dianhydride-3,5-diaminobenzoic acid-3,3'-dihydroxy-4,4'-diamino-biphenyl]polyimide derived from the polycondensation reaction of 2,2'-bis-(3,4-dicarboxyphenyl) hexafluoropropane dianhydride with a mixture of 3,5-diaminobenzoic acid and 3,3'-dihydroxy-4,4'-diamino-biphenyl; poly[2,2'-bis-(3,4-dicarboxyphenyl) hexafluoropropane dianhydride-2,2-bis(3-amino-4-hydroxyphenyl)-hexafluoropropane-3,5-diaminobenzoic acid] derived from a polycondensation reaction of 2,2'-bis-(3,4-dicarboxyphenyl) hexafluoropropane dianhydride with a mixture of 2,2-bis(3-amino-4-hydroxyphenyl)-hexafluoropropane and 3,5-diaminobenzoic acid; poly[3,3',4,4'-benzophenonetetracarboxylic dianhydride-2,2-bis(3-amino-4-hydroxyphenyl)-hexafluoropropane-3,5-diaminobenzoic acid] derived from a polycondensation reaction of 3,3',4,4'-benzophenonetetracarboxylic dianhydride with a mixture of 2,2-bis(3-amino-4-hydroxyphenyl)-hexafluoropropane and 3,5-diaminobenzoic acid; poly[4,4'-oxydiphthalic anhydride-2,2-bis(3-amino-4-hydroxyphenyl)-hexafluoropropane-3,5-diaminobenzoic acid] derived from a polycondensation reaction of 4,4'-oxydiphthalic anhydride with a mixture of 2,2-bis(3-amino-4-hydroxyphenyl)-hexafluoropropane and 3,5-diaminobenzoic acid; poly[3,3',4,4'-diphenylsulfone tetracarboxylic dianhydride-2,2-bis(3-amino-4-hydroxyphenyl)-hexafluoropropane-3,5-diaminobenzoic acid] derived from a polycondensation reaction of 3,3',4,4'-diphenylsulfone tetracarboxylic dianhydride with a mixture of 2,2-bis(3-amino-4-hydroxyphenyl)-hexafluoropropane and 3,5-diaminobenzoic acid; poly[2,2'-bis-(3,4-dicarboxyphenyl) hexafluoropropane dianhydride-3,3',4,4'-benzophenonetetracarboxylic dianhydride-2,2-bis(3-amino-4-hydroxyphenyl)-hexafluoropropane-3,5-diaminobenzoic acid] derived from a polycondensation reaction of 2,2'-bis-(3,4-dicarboxyphenyl) hexafluoropropane dianhydride and 3,3',4,4'-benzophenonetetracarboxylic dianhydride with a mixture of 2,2-bis(3-amino-4-hydroxyphenyl)-hexafluoropropane and 3,5-diaminobenzoic acid; poly[4,4'-oxydiphthalic anhydride-2,2-bis(3-amino-4-hydroxyphenyl)-hexafluoropropane-3,3'-dihydroxy-4,4'-diamino-biphenyl-3,5-diaminobenzoic acid] derived from a polycondensation reaction of 4,4'-oxydiphthalic anhydride with a mixture of 2,2-bis(3-amino-4-hydroxyphenyl)-hexafluoropropane, 3,3'-dihydroxy-4,4'-diamino-biphenyl and 3,5-diaminobenzoic acid; poly[3,3',4,4'-benzophenonetetracarboxylic dianhydride-2,2-bis(3-amino-4-hydroxyphenyl)-hexafluoropropane-3,3'-dihydroxy-4,4'-diamino-biphenyl-3,5-diaminobenzoic acid] derived from a polycondensation reaction of 3,3',4,4'-benzophenonetetracarboxylic dianhydride with a mixture of 2,2-bis(3-amino-4-hydroxyphenyl)-hexafluoropropane, 3,3'-dihydroxy-4,4'-diamino-biphenyl, and 3,5-diaminobenzoic acid.

In a preferred embodiment of the invention the self-cross-linkable aromatic polyimide polymer comprises both hydroxyl functional groups and carboxylic acid functional groups described in the current invention may include, but are not limited to: poly(3,3',4,4'-diphenylsulfone tetracarboxylic dianhydride-3,5-diaminobenzoic acid-3,3'-dihydroxy-4,4'-diamino-biphenyl-2,4,6-trimethyl-m-phenylenediamine) polyimide derived from a polycondensation reaction of 3,3',4,4'-diphenylsulfone tetracarboxylic dianhydride with a mixture of 3,5-diaminobenzoic acid, 3,3'-dihydroxy-4,4'-diamino-biphenyl and 2,4,6-trimethyl-m-phenylenediamine; poly(3,3',4,4'-diphenylsulfone tetracarboxylic dianhydride-3,5-diaminobenzoic acid-3,3'-dihydroxy-4,4'-diamino-biphenyl-3,3',5,5'-tetramethyl-4,4'-methylene dianiline)polyimide derived from a polycondensation reaction of 3,3',4,4'-diphenylsulfone tetracarboxylic dianhydride with a mixture of 3,5-diaminobenzoic acid, 3,3'-dihydroxy-4,4'-diamino-biphenyl and 3,3',5,5'-tetramethyl-4,4'-methylene dianiline; poly(3,3',4,4'-benzophenone tetracarboxylic dianhydride-pyromellitic dianhydride-3,5-diaminobenzoic acid-3,3'-dihydroxy-4,4'-diamino-biphenyl-2,4,6-trimethyl-m-phenylenediamine)polyimide derived from a polycondensation reaction of 3,3',4,4'-benzophenone tetracarboxylic dianhydride and pyromellitic dianhydride with 3,5-diaminobenzoic acid, 3,3'-dihydroxy-4,4'-diamino-biphenyl and 2,4,6-trimethyl-m-phenylenediamine; poly(3,3',4,4'-benzophenone tetracarboxylic dianhydride-pyromellitic dianhydride-3,5-diaminobenzoic acid-3,3'-dihydroxy-4,4'-diamino-biphenyl-3,3',5,5'-tetramethyl-4,4'-methylene dianiline)polyimide derived from a polycondensation reaction of 3,3',4,4'-benzophenone tetracarboxylic dianhydride and pyromellitic dianhydride with 3,5-diaminobenzoic acid, 3,3'-dihydroxy-4,4'-diamino-biphenyl and 3,3',5,5'-tetramethyl-4,4'-methylene dianiline; poly[2,2'-bis-(3,4-dicarboxyphenyl) hexafluoropropane dianhydride-3,5-diaminobenzoic acid-3,3'-dihydroxy-4,4'-diamino-biphenyl]polyimide derived from the polycondensation reaction of 2,2'-bis-(3,4-dicarboxyphenyl) hexafluoropropane dianhydride with a mixture of 3,5-diaminobenzoic acid and 3,3'-dihydroxy-4,4'-diamino-biphenyl; poly(3,3',4,4'-diphenylsulfone tetracarboxylic dianhydride-3,5-diaminobenzoic acid-3,3'-dihydroxy-4,4'-diamino-biphenyl)polyimide derived from a polycondensation reaction of 3,3',4,4'-diphenylsulfone tetracarboxylic dianhydride with a mixture of 3,5-diaminobenzoic acid and 3,3'-dihydroxy-4,4'-diamino-biphenyl; poly(3,3',4,4'-benzophenone tetracarboxylic dianhydride-pyromellitic dianhydride-3,5-diaminobenzoic acid-3,3'-dihydroxy-4,4'-diamino-biphenyl)polyimide derived from a polycondensation reaction of 3,3',4,4'-benzophenone tetracarboxylic dianhydride and pyromellitic dianhydride with 3,5-diaminobenzoic acid and 3,3'-dihydroxy-4,4'-diamino-biphenyl.

An embodiment of the invention further comprises a self-cross-linked aromatic polyimide polymer comprising a formula (II):

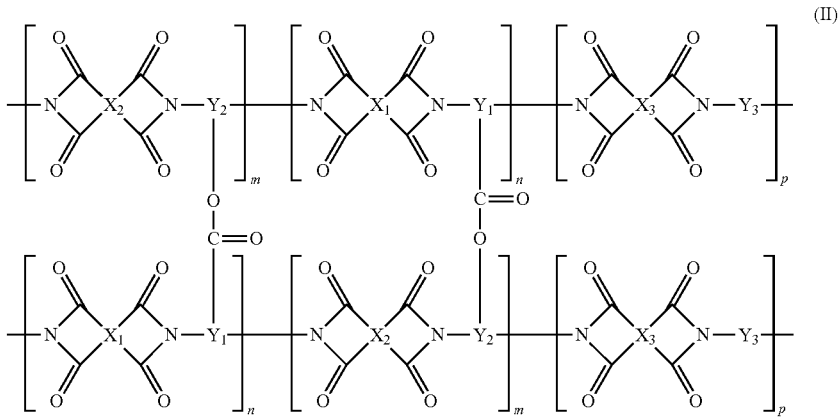

wherein $X_1$, $X_2$, and $X_3$ are selected from the group consisting of

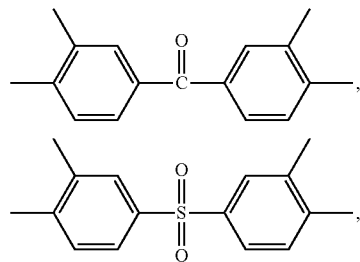

-continued
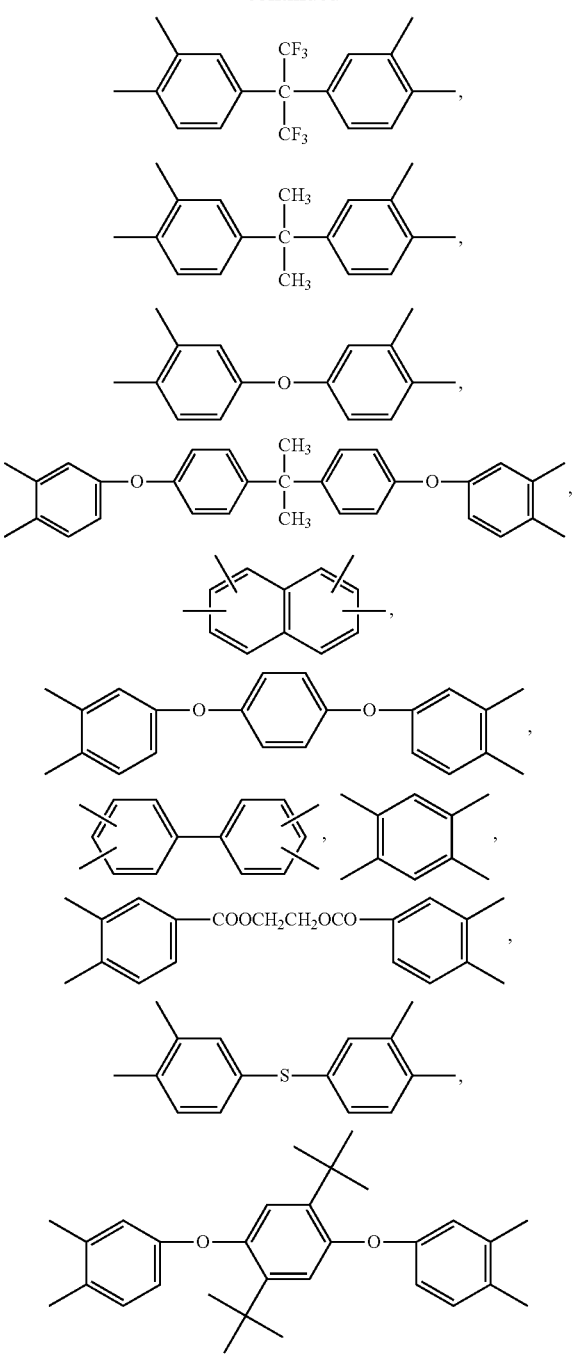
and mixtures thereof, respectively; $X_1$, $X_2$, and $X_3$ are the same or different from each other; $Y_1$—CO— is selected from the group consisting of
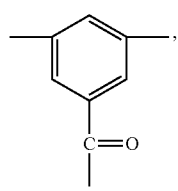
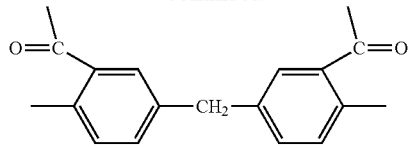
and mixtures thereof; $Y_2$—O— is selected from the group consisting of
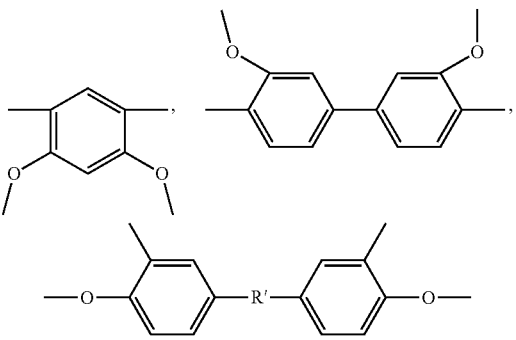
and mixtures thereof, and —R'— is selected from the group consisting of
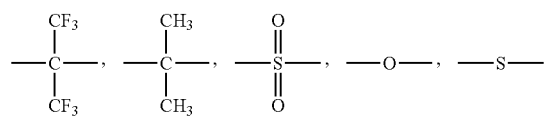
and mixtures thereof; $Y_3$ is selected from the group consisting of
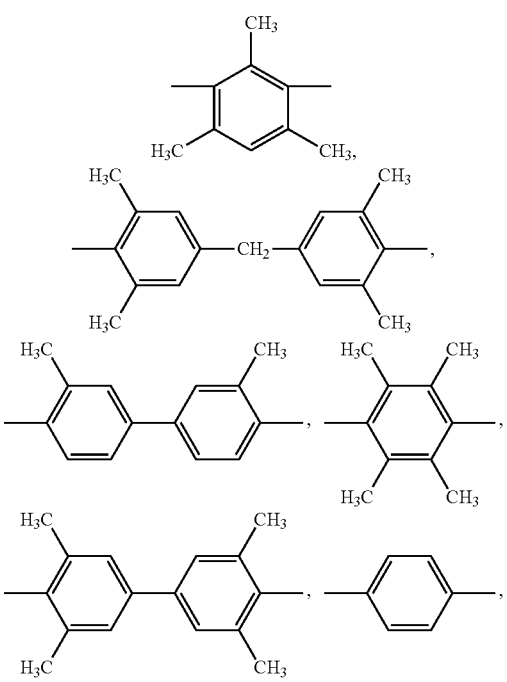

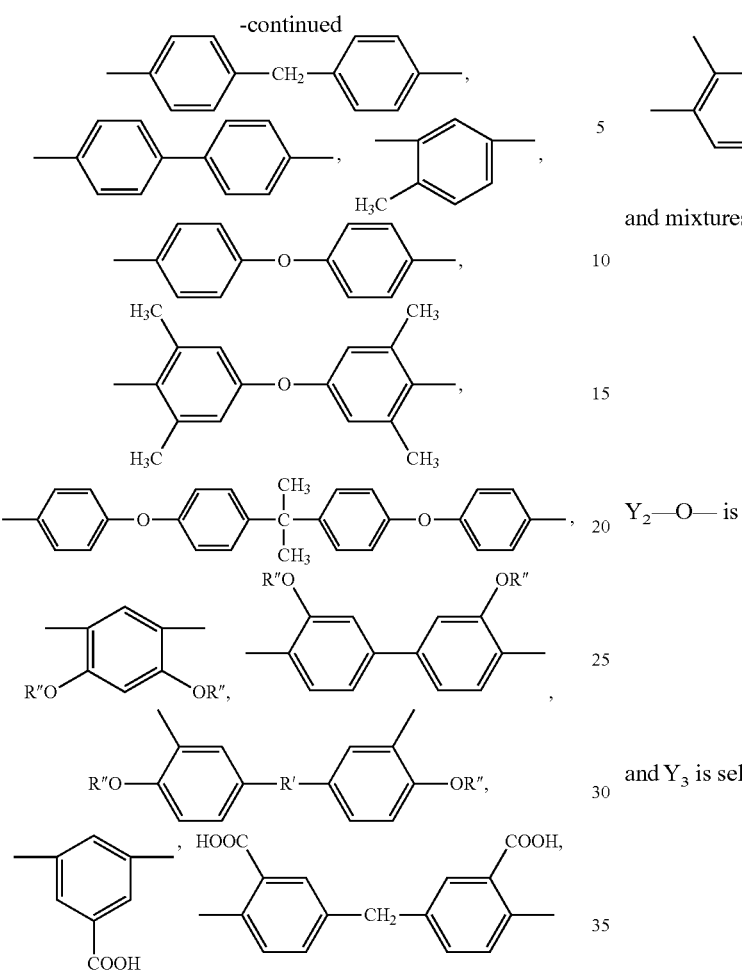

and mixtures thereof, and —R'— is selected from the group consisting of and mixtures thereof, and —R"— is selected from the group consisting of —H, COCH$_3$, and mixtures thereof; n, m, and p are independent integers from 2 to 500; the molar ratio of (n+m)/p is in a range of 1:20 to 1:0; and the molar ratio of n/m is in a range of 1:10 to 10:1.

In preferred embodiments of the invention, X$_1$, X$_2$, and X$_3$ are selected from the group consisting of and mixtures thereof, Y$_1$—CO— is Y$_2$—O— is and Y$_3$ is selected from the group consisting of and mixtures thereof In an embodiment of the invention, any of the polymers in the preceding paragraphs may be formed into a membrane.

The invention further comprises a process for preparing a self-cross-linked aromatic polyimide polymer membrane comprising making the self-cross-linkable aromatic polyimide polymer membrane from a self-cross-linkable aromatic polyimide polymer comprising both hydroxyl functional groups and carboxylic acid functional groups, and then cross-linking the self-cross-linkable aromatic polyimide polymer membrane by applying heat to said membrane at about 250° C. to 350° C. under an inert atmosphere.

In an embodiment of the process of the invention, the self-cross-linkable aromatic polyimide polymer membrane comprises a formula (I)

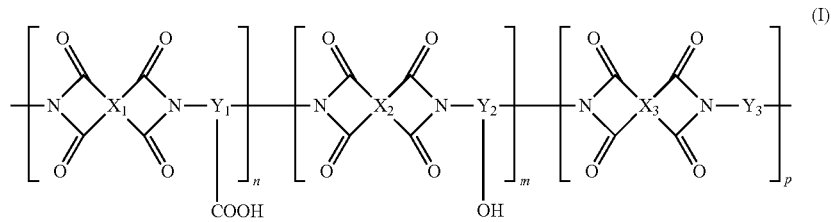

wherein $X_1$, $X_2$, and $X_3$ are selected from the group consisting of

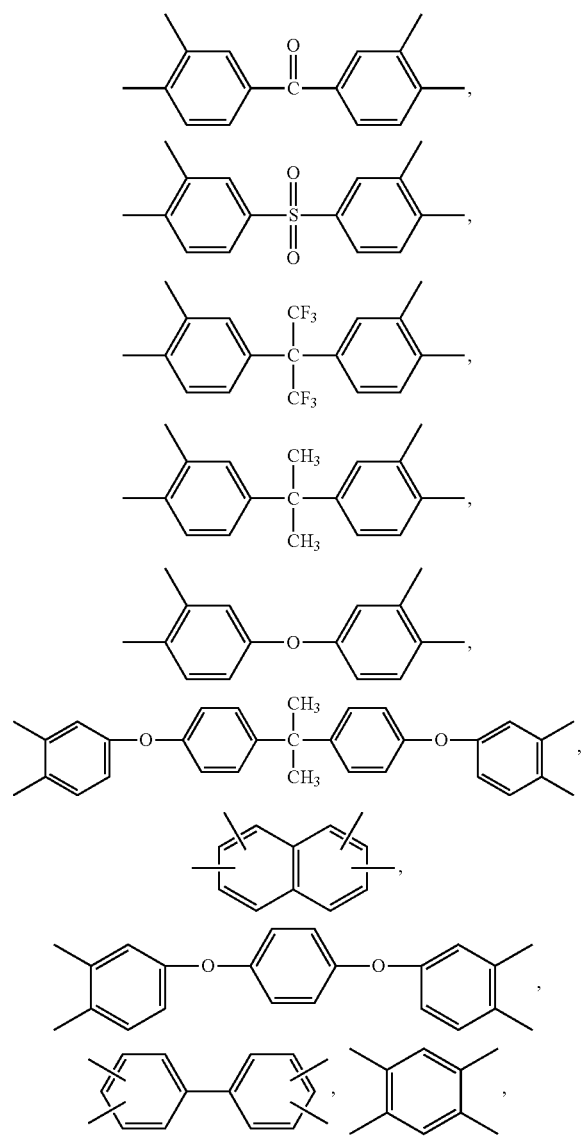

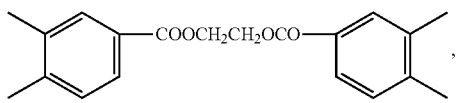

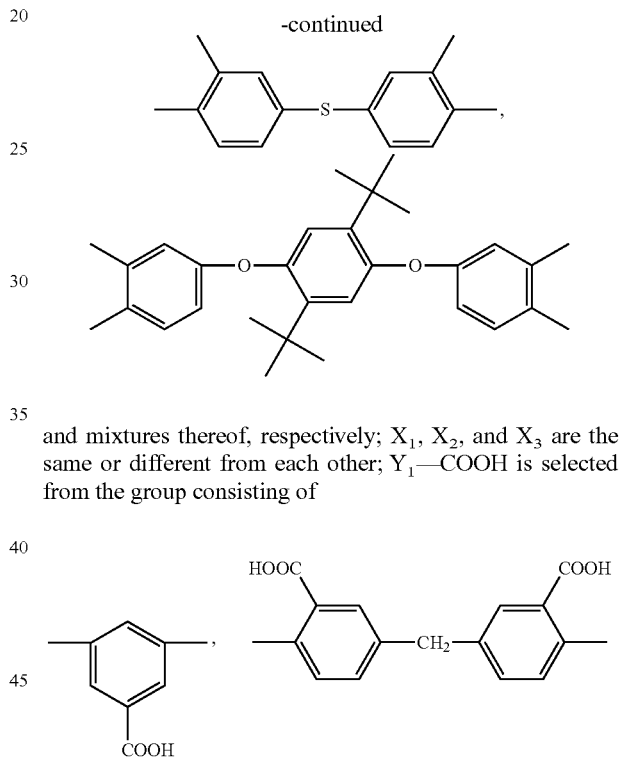

and mixtures thereof, respectively; $X_1$, $X_2$, and $X_3$ are the same or different from each other; $Y_1$—COOH is selected from the group consisting of

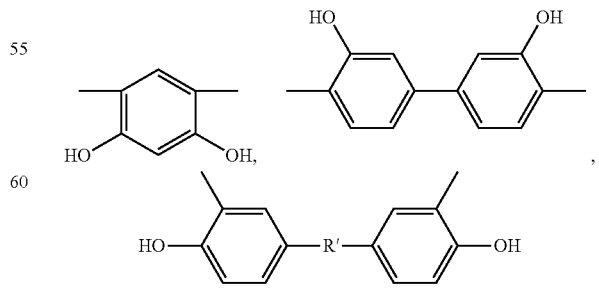

and mixtures thereof; $Y_2$—OH is selected from the group consisting of and mixtures thereof, and —R'— is selected from the group consisting of

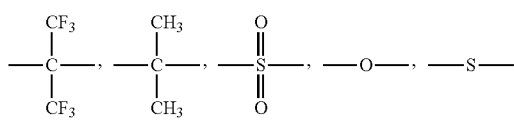

and mixtures thereof; Y₃ is selected from the group consisting of

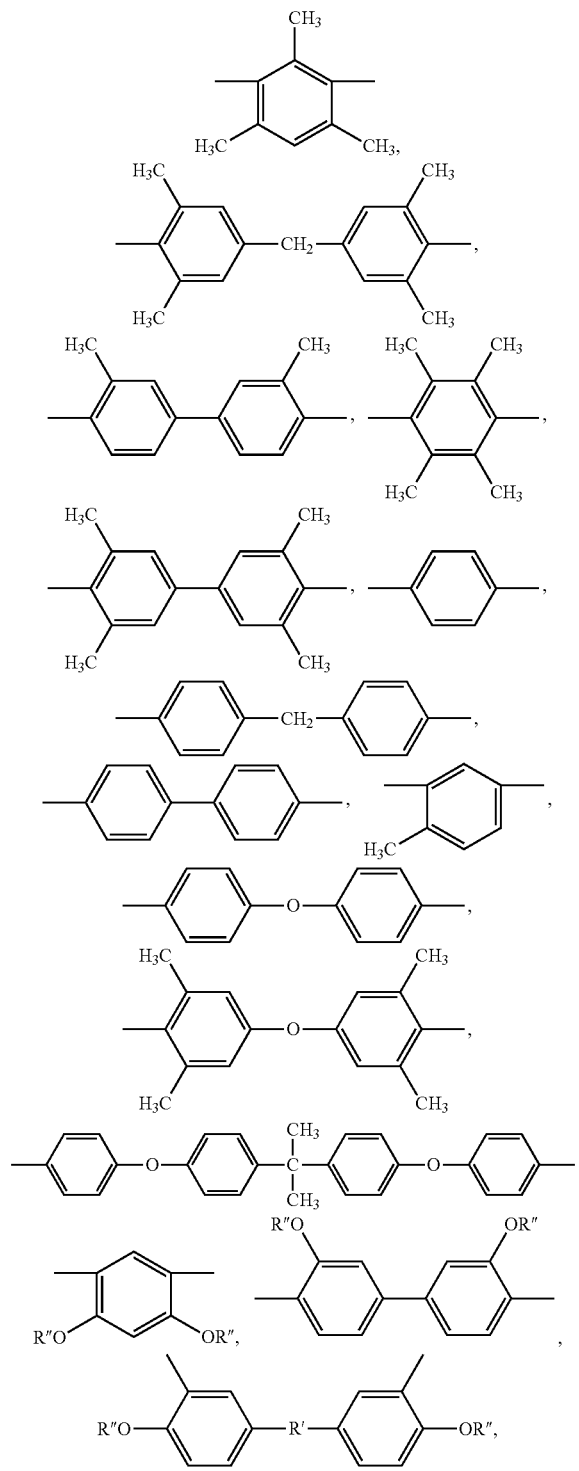

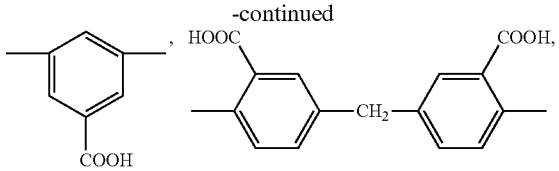

and mixtures thereof, and —R'— is selected from the group consisting of

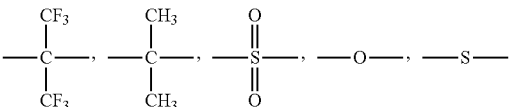

and mixtures thereof, and —R"— is selected from the group consisting of —H, COCH₃, and mixtures thereof; n, m, and p are independent integers from 2 to 500; the molar ratio of (n+m)/p is in a range of 1:20 to 1:0; the molar ratio of n/m is in a range of 1:10 to 10:1.

The process of preparing the membranes made by the process of the invention may further involve coating a high permeability material onto the membrane. The coating may be selected from the group consisting of a polysiloxane, a fluoro-polymer, a thermally curable silicone rubber, or a UV radiation curable epoxy silicone.

In the process of the invention the self-cross-linkable aromatic polyimide polymer comprises both hydroxyl functional groups and carboxylic acid functional groups and is selected from the group consisting of poly(3,3',4,4'-diphenylsulfone tetracarboxylic dianhydride-3,5-diaminobenzoic acid-3,3'-dihydroxy-4,4'-diamino-biphenyl-2,4,6-trimethyl-m-phenylenediamine)polyimide derived from a polycondensation reaction of 3,3',4,4'-diphenylsulfone tetracarboxylic dianhydride with a mixture of 3,5-diaminobenzoic acid, 3,3'-dihydroxy-4,4'-diamino-biphenyl and 2,4,6-trimethyl-m-phenylenediamine; poly(3,3',4,4'-diphenylsulfone tetracarboxylic dianhydride-3,5-diaminobenzoic acid-3,3'-dihydroxy-4,4'-diamino-biphenyl-3,3',5,5'-tetramethyl-4,4'-methylene dianiline)polyimide derived from a polycondensation reaction of 3,3',4,4'-diphenylsulfone tetracarboxylic dianhydride with a mixture of 3,5-diaminobenzoic acid, 3,3'-dihydroxy-4,4'-diamino-biphenyl and 3,3',5,5'-tetramethyl-4,4'-methylene dianiline; poly(3,3',4,4'-benzophenone tetracarboxylic dianhydride-pyromellitic dianhydride-3,5-diaminobenzoic acid-3,3'-dihydroxy-4,4'-diamino-biphenyl-2,4,6-trimethyl-m-phenylenediamine)polyimide derived from a polycondensation reaction of 3,3',4,4'-benzophenone tetracarboxylic dianhydride and pyromellitic dianhydride with 3,5-diaminobenzoic acid, 3,3'-dihydroxy-4,4'-diamino-biphenyl and 2,4,6-trimethyl-m-phenylenediamine; poly(3,3',4,4'-benzophenone tetracarboxylic dianhydride-pyromellitic dianhydride-3,5-diaminobenzoic acid-3,3'-dihydroxy-4,4'-diamino-biphenyl-3,3',5,5'-tetramethyl-4,4'-methylene dianiline)polyimide derived from a polycondensation reaction of 3,3',4,4'-benzophenone tetracarboxylic dianhydride and pyromellitic dianhydride with 3,5-diaminobenzoic acid, 3,3'-dihydroxy-4,4'-diamino-biphenyl and 3,3',5,5'-tetramethyl-4,4'-methylene dianiline; poly(3,3',4,4'-benzophenone tetracarboxylic dianhydride-3,5-diaminobenzoic acid-3,3'-dihydroxy-4,4'-diamino-biphenyl-3,3',5,5'-tetramethyl-4,4'-methylene dianiline)polyimide derived from a polycondensation reaction of 3,3',4,4'-benzophenone tetracarboxylic dianhydride with 3,5-diaminobenzoic acid, 3,3'-dihydroxy- 4,4'-diamino-biphenyl and 3,3',5,5'-tetramethyl-4,4'-methylene dianiline; poly[2,2'-bis-(3,4-dicarboxyphenyl) hexafluoropropane dianhydride-3,5-diaminobenzoic acid-3,3'-dihydroxy-4,4'-diamino-biphenyl]polyimide derived from the polycondensation reaction of 2,2'-bis-(3,4-dicarboxyphenyl) hexafluoropropane dianhydride with a mixture of 3,5-diaminobenzoic acid and 3,3'-dihydroxy-4,4'-diamino-biphenyl; poly[2,2'-bis-(3,4-dicarboxyphenyl) hexafluoropropane dianhydride-2,2-bis(3-amino-4-hydroxyphenyl)-hexafluoropropane-3,5-diaminobenzoic acid] derived from a polycondensation reaction of 2,2'-bis-(3,4-dicarboxyphenyl) hexafluoropropane dianhydride with a mixture of 2,2-bis(3-amino-4-hydroxyphenyl)-hexafluoropropane and 3,5-diaminobenzoic acid; poly[3,3',4,4'-benzophenonetetracarboxylic dianhydride-2,2-bis(3-amino-4-hydroxyphenyl)-hexafluoropropane-3,5-diaminobenzoic acid] derived from a polycondensation reaction of 3,3',4,4'-benzophenonetetracarboxylic dianhydride with a mixture of 2,2-bis(3-amino-4-hydroxyphenyl)-hexafluoropropane and 3,5-diaminobenzoic acid; poly[4,4'-oxydiphthalic anhydride-2,2-bis(3-amino-4-hydroxyphenyl)-hexafluoropropane-3,5-diaminobenzoic acid] derived from a polycondensation reaction of 4,4'-oxydiphthalic anhydride with a mixture of 2,2-bis(3-amino-4-hydroxyphenyl)-hexafluoropropane and 3,5-diaminobenzoic acid; poly[3,3',4,4'-diphenylsulfone tetracarboxylic dianhydride-2,2-bis(3-amino-4-hydroxyphenyl)-hexafluoropropane-3,5-diaminobenzoic acid] derived from a polycondensation reaction of 3,3',4,4'-diphenylsulfone tetracarboxylic dianhydride with a mixture of 2,2-bis(3-amino-4-hydroxyphenyl)-hexafluoropropane and 3,5-diaminobenzoic acid; poly[2,2'-bis-(3,4-dicarboxyphenyl) hexafluoropropane dianhydride-3,3',4,4'-benzophenonetetracarboxylic dianhydride-2,2-bis(3-amino-4-hydroxyphenyl)-hexafluoropropane-3,5-diaminobenzoic acid] derived from a polycondensation reaction of 2,2'-bis-(3,4-dicarboxyphenyl) hexafluoropropane dianhydride and 3,3',4,4'-benzophenonetetracarboxylic dianhydride with a mixture of 2,2-bis(3-amino-4-hydroxyphenyl)-hexafluoropropane and 3,5-diaminobenzoic acid; poly[4,4'-oxydiphthalic anhydride-2,2-bis(3-amino-4-hydroxyphenyl)-hexafluoropropane-3,3'-dihydroxy-4,4'-diamino-biphenyl-3,5-diaminobenzoic acid] derived from a polycondensation reaction of 4,4'-oxydiphthalic anhydride with a mixture of 2,2-bis(3-amino-4-hydroxyphenyl)-hexafluoropropane, 3,3'-dihydroxy-4,4'-diamino-biphenyl and 3,5-diaminobenzoic acid; poly[3,3',4,4'-benzophenonetetracarboxylic dianhydride-2,2-bis(3-amino-4-hydroxyphenyl)-hexafluoropropane-3,3'-dihydroxy-4,4'-diamino-biphenyl-3,5-diaminobenzoic acid] derived from a polycondensation reaction of 3,3',4,4'-benzophenonetetracarboxylic dianhydride with a mixture of 2,2-bis(3-amino-4-hydroxyphenyl)-hexafluoropropane, 3,3'-dihydroxy-4,4'-diamino-biphenyl, and 3,5-diaminobenzoic acid.

A further embodiment of the invention, comprises a process for separating at least one gas from a mixture of gases comprising providing a self-cross-linked aromatic polyimide membrane of formula (II) comprising

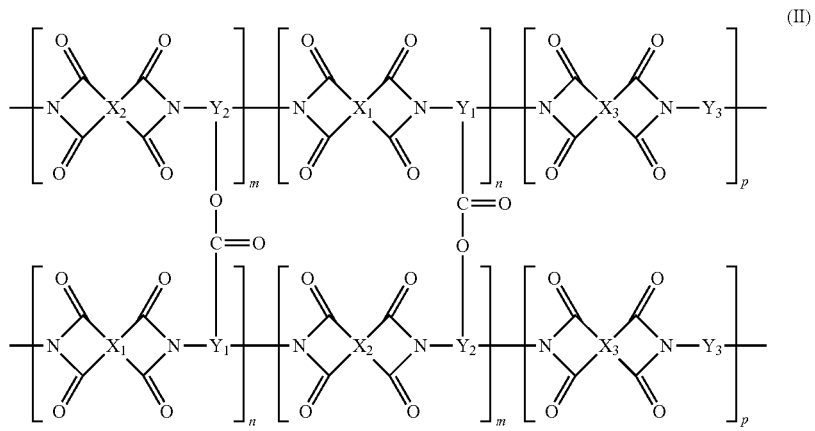

(II)

wherein $X_1$, $X_2$, and $X_3$ are selected from the group consisting of

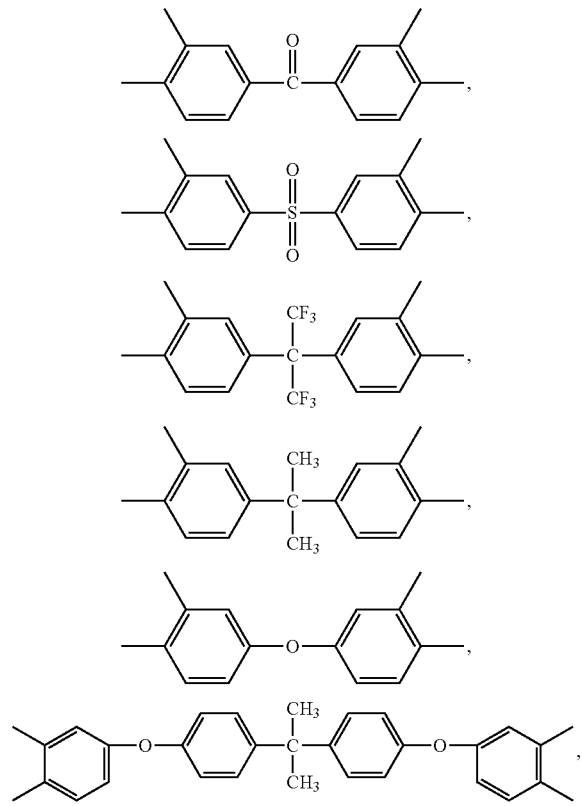

-continued

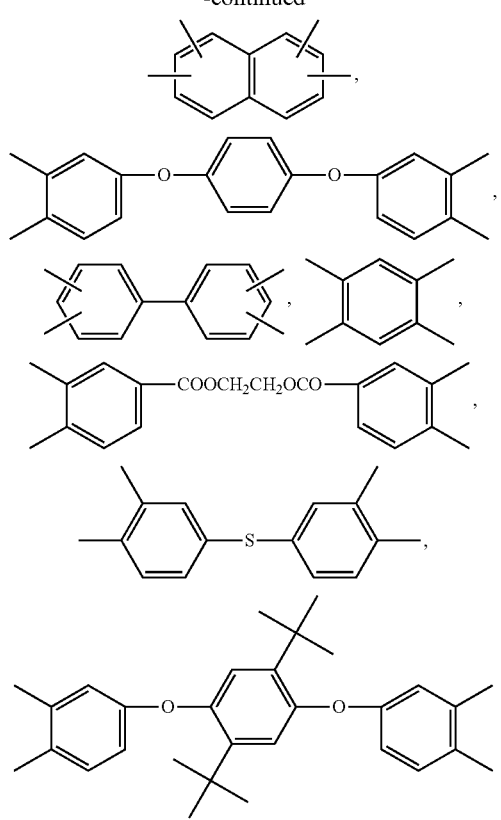

and mixtures thereof, respectively; $X_1$, $X_2$, and $X_3$ are the same or different from each other; $Y_1$—CO— is selected from the group consisting of

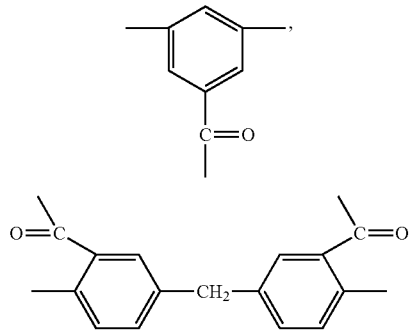

and mixtures thereof; $Y_2$—O— is selected from the group consisting of

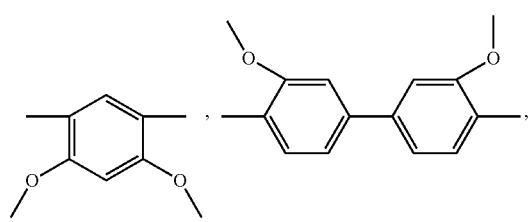

-continued

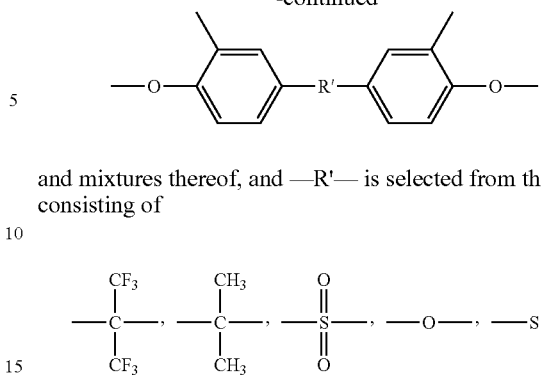

and mixtures thereof, and —R'— is selected from the group consisting of

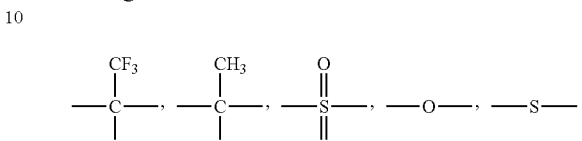

and mixtures thereof; $Y_3$ is selected from the group consisting of

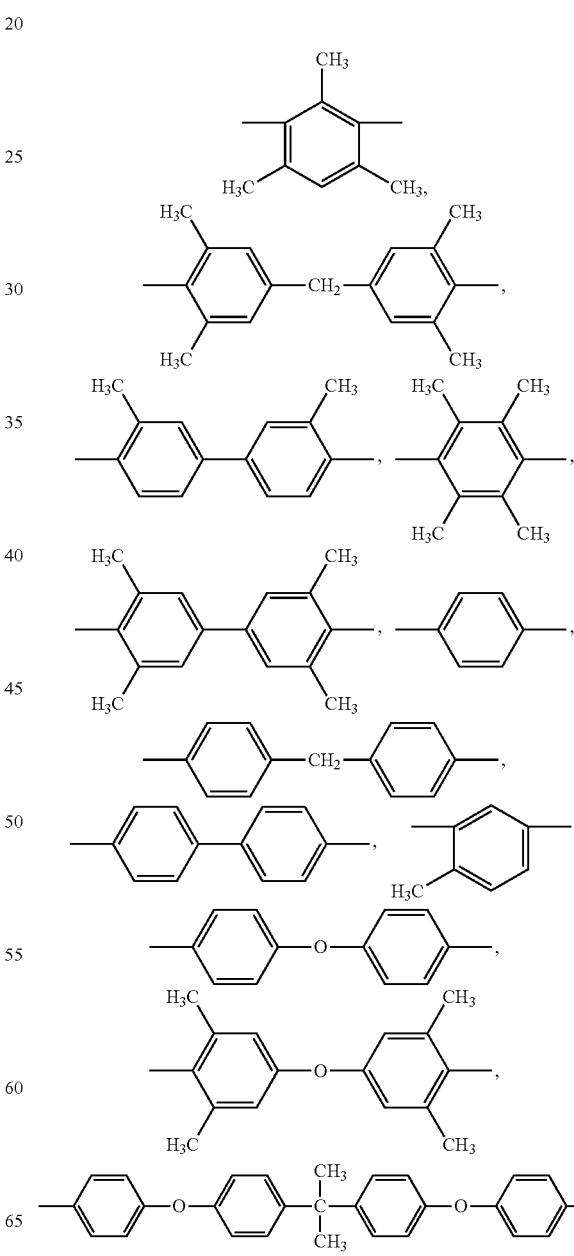

-continued

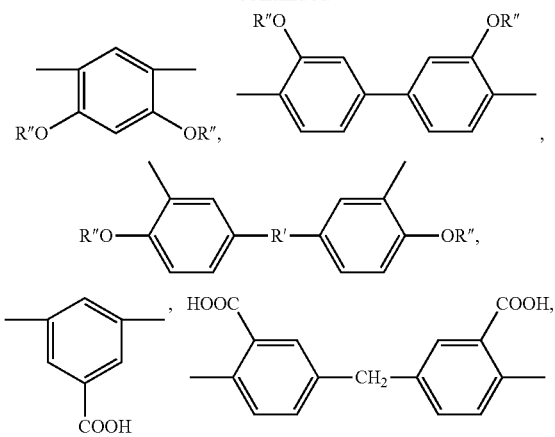

and mixtures thereof, and —R'— is selected from the group consisting of

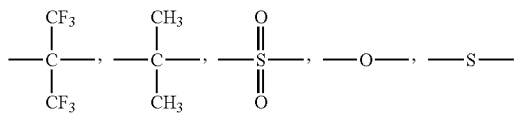

and mixtures thereof, and —R"— is selected from the group consisting of —H, COCH$_3$, and mixtures thereof; n, m, and p are independent integers from 2 to 500; the molar ratio of (n+m)/p is in a range of 1:20 to 1:0; and the molar ratio of n/m is in a range of 1:10 to 10:1, contacting the mixture of gases to one side of the self-cross-linked aromatic polyimide membrane of formula (II) to cause at least one gas to permeate said membrane; and removing from an opposite side of said self-cross-linked aromatic polyimide membrane of formula (II) a permeate gas composition comprising a portion of said at least one gas that permeated said membrane.

In an embodiment of the process of using the membranes of the invention, $X_1$, $X_2$, and $X_3$ are selected from the group consisting of

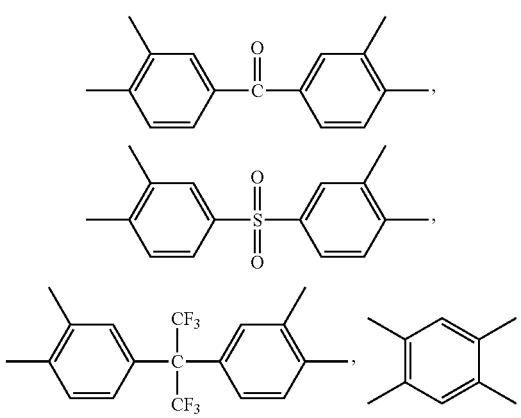

and mixtures thereof, n $Y_1$—COOH is

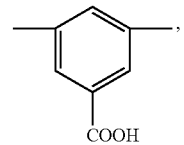

$Y_2$—OH is

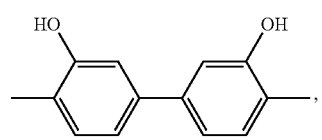

and $Y_3$ is selected from the group consisting of

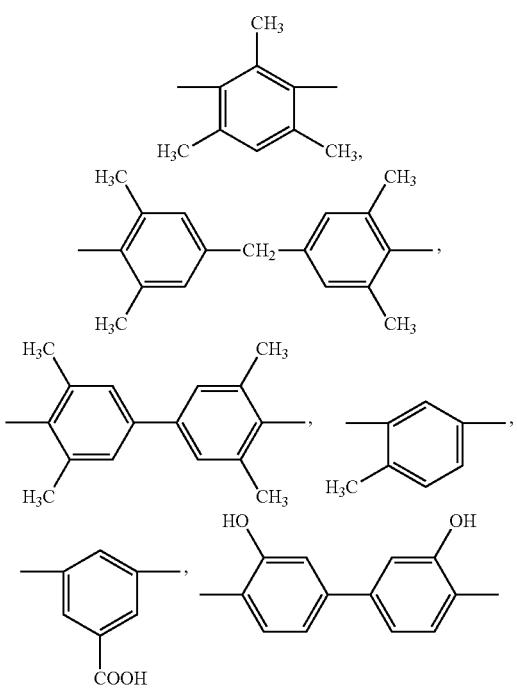

and mixtures thereof

In an embodiment of the invention, the mixture of gases comprises a mixture of carbon dioxide and methane, a mixture of hydrogen and methane or a mixture of gases a mixture of helium and methane. The mixture of gases may comprise a mixture of at least one volatile organic compound and at least one atmospheric gas. The mixture of gases may comprise nitrogen and hydrogen. The mixture of gases may comprise a mixture of carbon dioxide, oxygen, nitrogen, water vapor, hydrogen sulfide, helium and methane. The self-cross-linked aromatic polyimide polymer membrane used in the process may comprise a species that adsorbs strongly to at least one gas. The mixture of gases may comprise a mixture of paraffins and olefins.

In another embodiment of the invention, the invention comprises a process for separation of liquid mixtures by pervaporation comprising contacting said liquid mixture with a membrane comprising self-cross-linked aromatic polyimide membrane of formula (II) comprising

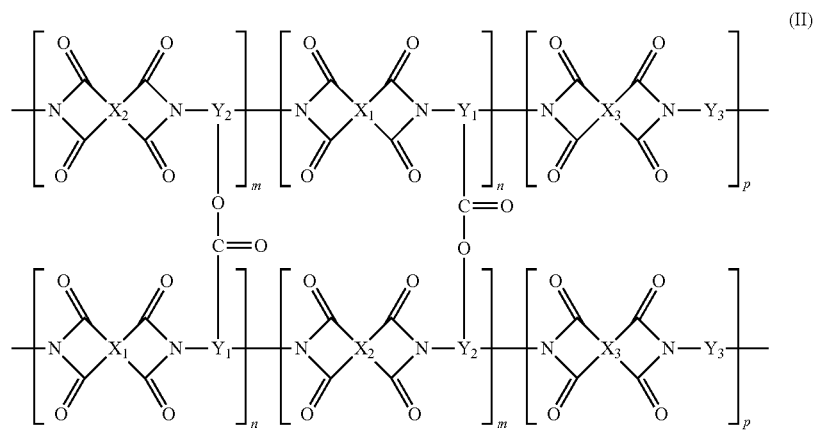
wherein $X_1$, $X_2$, and $X_3$ are selected from the group consisting of
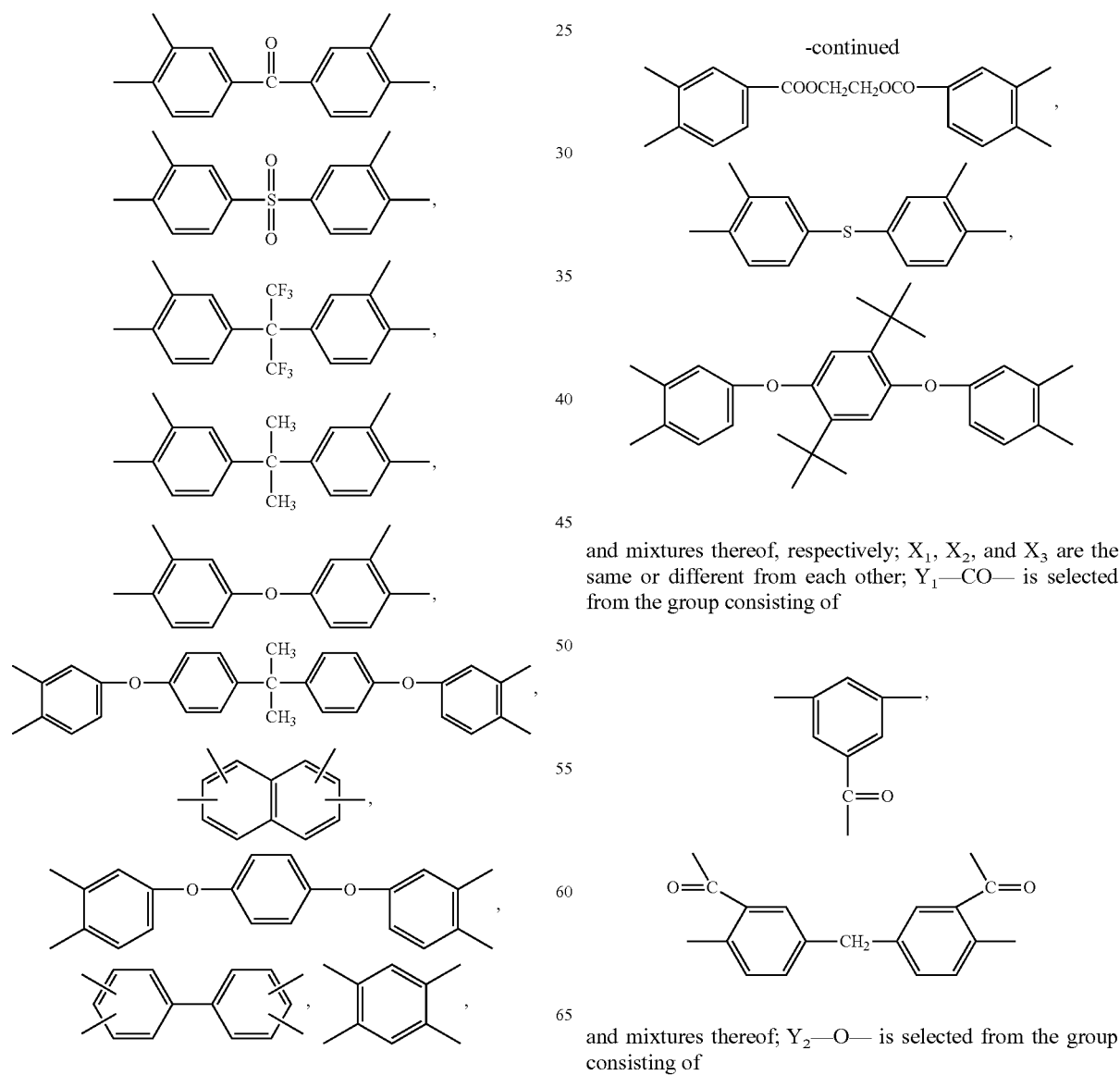
and mixtures thereof, respectively; $X_1$, $X_2$, and $X_3$ are the same or different from each other; $Y_1$—CO— is selected from the group consisting of
and mixtures thereof; $Y_2$—O— is selected from the group consisting of

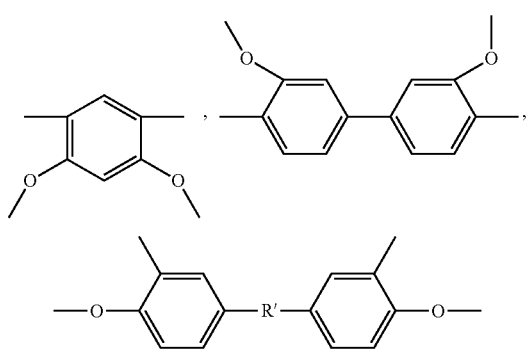

and mixtures thereof, and —R'— is selected from the group consisting of

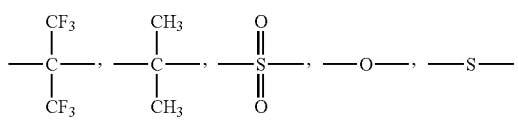

and mixtures thereof; $Y_3$ is selected from the group consisting of

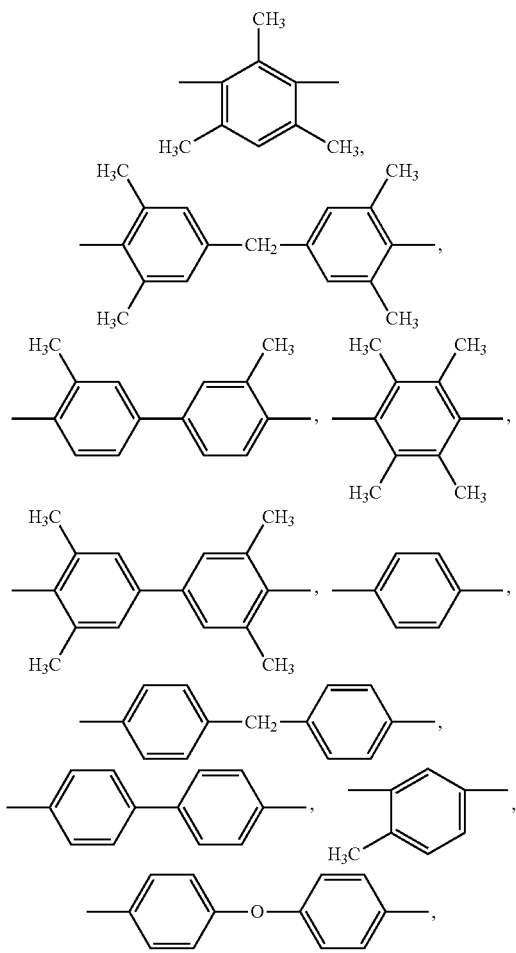

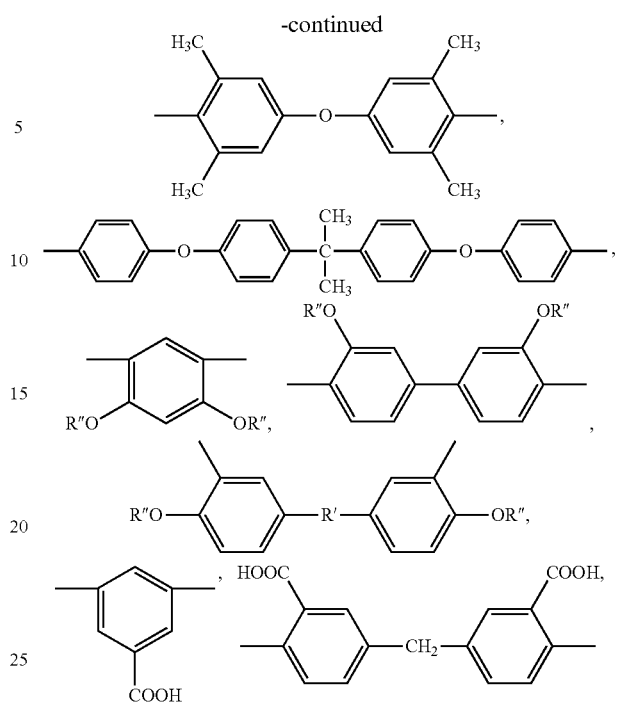

and mixtures thereof, and —R'— is selected from the group consisting of

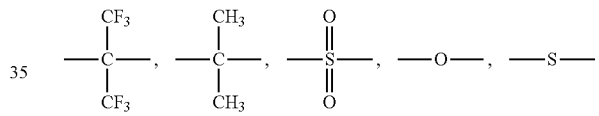

and mixtures thereof, and —R"— is selected from the group consisting of —H, $COCH_3$, and mixtures thereof; n, m, and p are independent integers from 2 to 500; the molar ratio of (n+m)/p is in a range of 1:20 to 1:0; and the molar ratio of n/m is in a range of 1:10 to 10:1. In the process of this embodiment of the invention, the liquid mixture may comprise water and one or more organic compounds selected from the group consisting of alcohols, phenols, chlorinated hydrocarbons, pyridines, and ketones. In another embodiment of the invention, the liquid mixture comprises sulfur-containing molecules in a hydrocarbon stream. The liquid mixture may comprise a mixture of isomers of organic compounds. In an embodiment of the process of the invention, the liquid mixture comprises a mixture selected from the group consisting of: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid. The liquid mixture may comprise dilute ethanol solution and where said process increases an ethanol concentration in said liquid mixture.

The invention claimed is:
1. A process for separating at least one gas from a mixture of gases comprising providing a self-cross-linked aromatic polyimide membrane of formula (II) comprising

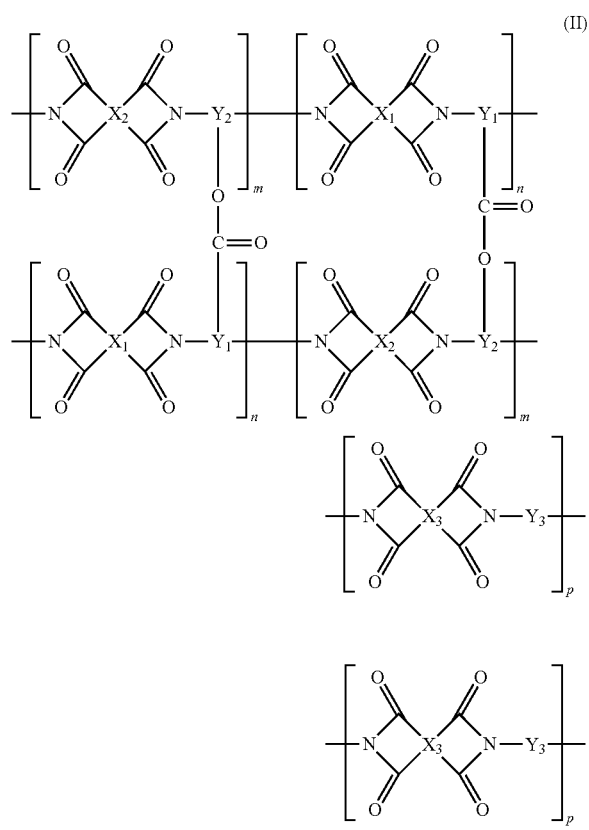
(II)
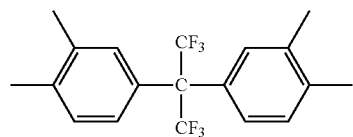
wherein $X_1$ is
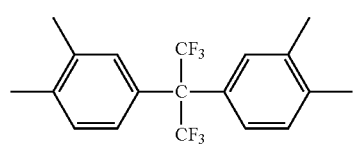
wherein $X_2$ is
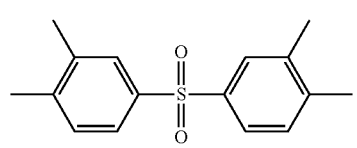
wherein $X_3$ is
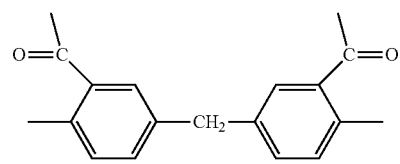 [SMILES: CC(=O)c1cc(Cc2ccc(C)c(C(C)=O)c2)ccc1C]
wherein $Y_1$—CO— is
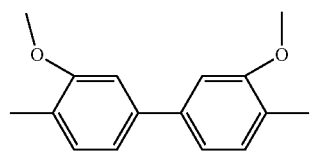
; $Y_2$—O— is
and mixtures thereof; $Y_3$ is selected from the group consisting of
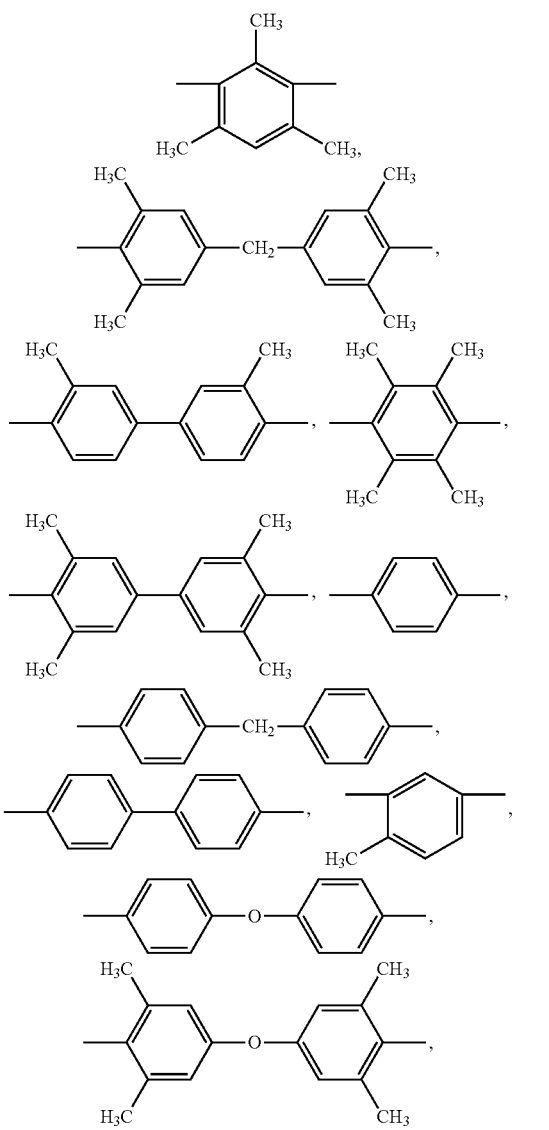

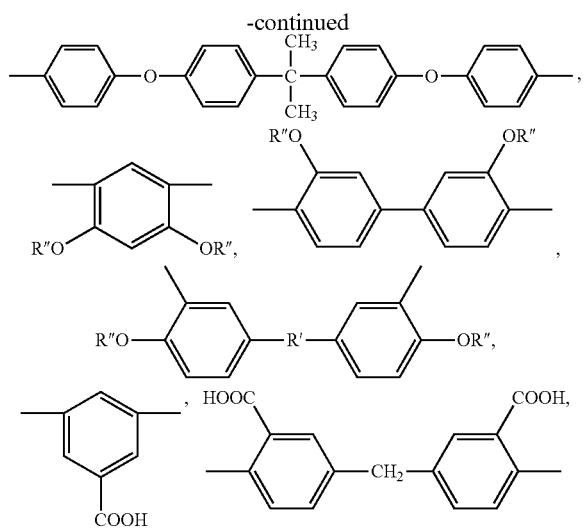

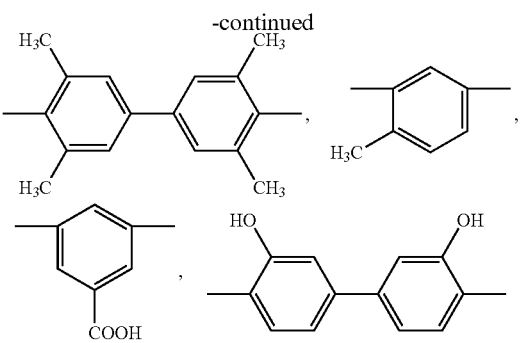

and mixtures thereof, and —R'— is selected from the group consisting of

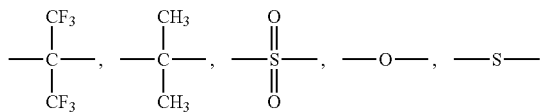

and mixtures thereof, and —R"— is selected from the group consisting of —H, $COCH_3$, and mixtures thereof; n, m, and p are independent integers from 2 to 500; the molar ratio of (n+m)/p is in a range of 1:20 to 1:0; and the molar ratio of n/m is in a range of 1:10 to 10:1 and contacting the mixture of gases to one side of the self-cross-linked aromatic polyimide membrane of formula (II) to cause at least one gas to permeate said membrane; and removing from an opposite side of said self-cross-linked aromatic polyimide membrane of formula (II) a permeate gas composition comprising a portion of said at least one gas that permeated said membrane.

2. The process of claim 1 wherein $Y_3$ is selected from the group consisting of

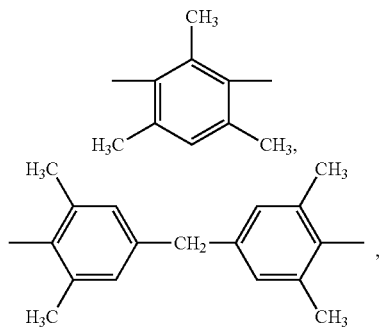

and mixtures thereof.

3. The process of claim 1 wherein said mixture of gases comprises a mixture of carbon dioxide and methane.

4. The process of claim 1 wherein said mixture of gases comprises a mixture of hydrogen and methane.

5. The process of claim 1 wherein said mixture of gases comprises a mixture of helium and methane.

6. The process of claim 1 wherein said mixture of gases comprises a mixture of at least one volatile organic compound and at least one atmospheric gas.

7. The process of claim 1 wherein said mixture of gases comprises nitrogen and hydrogen.

8. The process of claim 1 wherein said mixture of gases comprises a mixture of carbon dioxide, oxygen, nitrogen, water vapor, hydrogen sulfide, helium and methane.

9. The process of claim 1 wherein said self-cross-linked aromatic polyimide polymer membrane comprises a species that adsorbs strongly to at least one gas.

10. The process of claim 1 wherein said mixture of gases comprises a mixture of paraffins and olefins.

11. A process for separation of liquid mixtures by pervaporation comprising contacting said liquid mixture with a membrane comprising self-cross-linked aromatic polyimide membrane comprising the polyimide of claim 1.

12. The process of claim 11 wherein said liquid mixture comprises water and one or more organic compounds selected from the group consisting of alcohols, phenols, chlorinated hydrocarbons, pyridines, and ketones.

13. The process of claim 11 wherein said liquid mixture comprises sulfur-containing molecules in a hydrocarbon stream.

14. The process of claim 11 wherein said liquid mixture comprises a mixture of isomers of organic compounds.

15. The process of claim 11 wherein said liquid mixture comprises a mixture selected from the group consisting of: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

16. The process of claim 14 wherein said liquid mixture comprises a dilute ethanol solution and where said process increases an ethanol concentration in said liquid mixture.

* * * * *